US012495826B2

(12) United States Patent
Liu

(10) Patent No.: US 12,495,826 B2
(45) Date of Patent: Dec. 16, 2025

(54) SMOKING DEVICE CARTRIDGE

(71) Applicant: Future Technology Co., Ltd., Izumi (JP)

(72) Inventor: Kaipeng Liu, Izumi (JP)

(73) Assignee: Future Technology Co., Ltd., Izumi (JP)

( * ) Notice: Subject to any disclaimer, the term of this patent is extended or adjusted under 35 U.S.C. 154(b) by 0 days.

(21) Appl. No.: 18/776,251

(22) Filed: Jul. 18, 2024

(65) Prior Publication Data

US 2024/0365852 A1 Nov. 7, 2024

Related U.S. Application Data

(63) Continuation of application No. PCT/JP2023/026086, filed on Jul. 14, 2023.

(30) Foreign Application Priority Data

Jul. 28, 2022 (JP) ................................ 2022-120465
Nov. 24, 2022 (JP) ................................ 2022-187739
Jul. 3, 2023 (JP) ................................ 2023-109454

(51) Int. Cl.
*A24F 40/465* (2020.01)
*A24D 1/20* (2020.01)
(Continued)

(52) U.S. Cl.
CPC ................ *A24D 1/20* (2020.01); *A24F 40/20* (2020.01); *A24F 40/465* (2020.01); *H05B 6/108* (2013.01)

(58) Field of Classification Search
CPC .......... A24F 40/465; A24F 40/20; A24D 1/20
See application file for complete search history.

(56) References Cited

U.S. PATENT DOCUMENTS

2016/0150825 A1 6/2016 Mironov et al.
2017/0071250 A1 3/2017 Mironov et al.
(Continued)

FOREIGN PATENT DOCUMENTS

JP 2016-525341 A 8/2016
JP 2016-529874 A 9/2016
(Continued)

OTHER PUBLICATIONS

International Search Report for PCT/JP2023/026086 dated Sep. 19, 2023.

(Continued)

*Primary Examiner* — Philip Y Louie
*Assistant Examiner* — Yana B Krinker
(74) *Attorney, Agent, or Firm* — Yokoi & Co., U.S.A.; Toshiyuki Yokoi

(57) ABSTRACT

To stably heat aerosol-forming substrates in a smoking device cartridge used for an induction heating type smoking device. A smoking device cartridge (1) to be mounted in an induction heating type smoking device (70) for use includes aerosol-forming substrates (10) and a mouthpiece (30) located coaxially with the aerosol-forming substrates (10). The smoking device cartridge (1) includes a first susceptor (20) containing a first magnetic material (20*a*) and a second susceptor (25) containing a second magnetic material (25*a*). The first susceptor (20) is located inside the aerosol-forming substrates (10) to enable heating of the aerosol-forming substrates (10). The second susceptor (25) is spaced apart from the first susceptor (20), or is in contact with the first susceptor (20). A Curie temperature of the second magnetic material (25*a*) is higher than a Curie temperature of the first magnetic material (20*a*).

5 Claims, 24 Drawing Sheets

(51) Int. Cl.

| | |
|---|---|
| ***A24F 40/20*** | (2020.01) |
| ***H05B 6/10*** | (2006.01) |

(56) References Cited

U.S. PATENT DOCUMENTS

| | | | |
|---|---|---|---|
| 2017/0079325 A1 | | 3/2017 | Mironov |
| 2018/0235279 A1 | | 8/2018 | Wilke et al. |
| 2018/0242636 A1 | | 8/2018 | Blandino et al. |
| 2018/0279681 A1 | | 10/2018 | Rojo-Calderon et al. |
| 2018/0295885 A1 | | 10/2018 | Rojo-Calderon et al. |
| 2019/0216133 A1 | | 7/2019 | Fursa et al. |
| 2021/0045451 A1 | | 2/2021 | Choi et al. |
| 2021/0127738 A1 | * | 5/2021 | Gill .......................... A24D 1/20 |
| 2021/0337874 A1 | | 11/2021 | Rogan |
| 2022/0030946 A1 | | 2/2022 | Zinovik et al. |
| 2023/0050462 A1 | | 2/2023 | Moloney et al. |
| 2023/0346018 A1 | | 11/2023 | Moloney et al. |

FOREIGN PATENT DOCUMENTS

| | | | | | |
|---|---|---|---|---|---|
| JP | 6165275 | B | | 7/2017 | |
| JP | 2018-528764 | A | | 10/2018 | |
| JP | 2018-530311 | A | | 10/2018 | |
| JP | 2018-537953 | A | | 12/2018 | |
| JP | 2018-537957 | A | | 12/2018 | |
| JP | 2019-528702 | A | | 10/2019 | |
| JP | 2021-515562 | A | | 6/2021 | |
| JP | 2022-501068 | A | | 1/2022 | |
| JP | 2022-502023 | A | | 1/2022 | |
| TW | 202002816 | A | * | 1/2020 | ............... A24C 5/01 |
| WO | 2021/053184 | A | | 3/2021 | |
| WO | 2021/144548 | A | | 7/2021 | |

OTHER PUBLICATIONS

Japanese notice of reasons for refusal dated Sep. 12, 2023.
Japanese notice of reasons for refusal dated Oct. 24, 2023.
Japanese decision to grant a patent dated Nov. 21, 2023.

* cited by examiner

SMOKING DEVICE CARTRIDGE

CROSS-REFERENCE TO RELATED APPLICATIONS

This Application claims the benefit of priority and is a Continuation application of the prior International Patent Application No. PCT/JP2023/026086, with an international filing date of Jul. 14, 2023, which designated the United States, and is related to the Japanese Patent Application No. 2022-120465, filed Jul. 28, 2022, the Japanese Patent Application No. 2022-187739, filed Nov. 24, 2022, and the Japanese Patent Application No. 2023-109454, filed Jul. 3, 2023, the entire disclosures of all applications are expressly incorporated by reference in their entirety herein.

TECHNICAL FIELD

The present invention relates to a smoking device cartridge.

BACKGROUND ART

In recent years, tobacco products for inhaling vaporized tobacco components by heating tobacco cartridges containing the tobacco components without using flame have become widely known. Due to the diversification of preferences, like tobaccos, cartridges for enjoying aromas and flavors of plants not containing tobacco components without using flame have also become known. Such cartridges are used by being mounted in heating type smoking devices.

As the heating type smoking devices, for example, a blade heating type smoking device and an induction heating type smoking device are known. For example, Patent Document 1 discloses a configuration of a cartridge used for the induction heating type smoking device. In the tobacco product described in Patent Document 1, tobacco sheet containing an aerosol-forming substrates and a susceptor (first susceptor) in the form of particles is wrapped by a wrapper in a state of being folded into a rod shape. When this tobacco product is mounted in the induction heating type smoking device and a switch of the device is turned on, an alternating current flows through a coil built into the smoking device, and thereby, an alternating magnetic field is generated. This causes an induced current to flow through the susceptor particles, and the susceptor particles are inductively heated. Since heat is transferred from the susceptor particles to the aerosol-forming substrates, the aerosol-forming substrates is heated and aerosol is generated.

PRIOR ART DOCUMENT

Patent Document

Japanese Patent No. 6165275

SUMMARY OF THE INVENTION

Problem to be Solved by the Invention

In the tobacco product described in Patent Document 1, there were cases where the aerosol-forming substrates could not be stably heated due to the induced current not flowing stably through the susceptor particles.

The present invention provides a smoking device cartridge used for an induction heating type smoking device to stably heat aerosol-forming substrates, in view of the above circumstances.

Means for Solving the Problem

One aspect of the present invention provides a smoking device cartridge to be mounted in an induction heating type smoking device for use, the smoking device cartridge comprising aerosol-forming substrates and a mouthpiece located coaxially with the aerosol-forming substrates. The smoking device cartridge further comprising: a first susceptor containing a first magnetic material; and a second susceptor containing a second magnetic material. The first susceptor is located inside the aerosol-forming substrates to enable inductively heating of the aerosol-forming substrates. The second susceptor is spaced apart from the first susceptor, or is in contact with the first susceptor.

A Curie temperature of the second magnetic material is higher than a Curie temperature of the first magnetic material.

Effect of the Invention

According to the present invention, in a smoking device cartridge used for an induction heating type smoking device, it is possible to stably heat aerosol-forming substrates. Problems, configurations, and effects other than those described above will become apparent from the following description of embodiments.

MODES FOR CARRYING OUT THE INVENTION

The following embodiments of the present invention will be described with reference to the drawings.

First Embodiment

Figure 1:
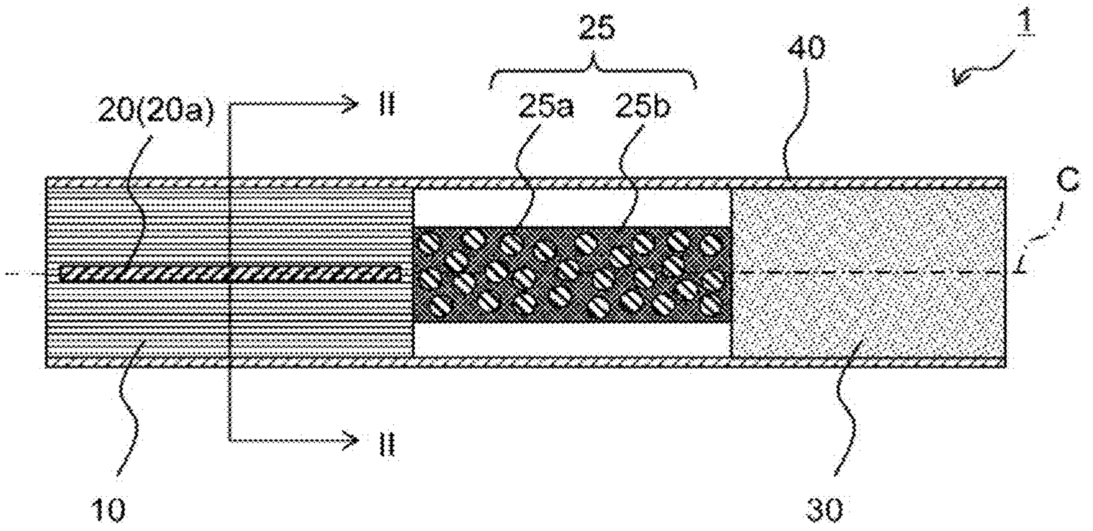
FIG. 1 is a cross-sectional view showing a smoking device cartridge according to a first embodiment.
Figure 2:
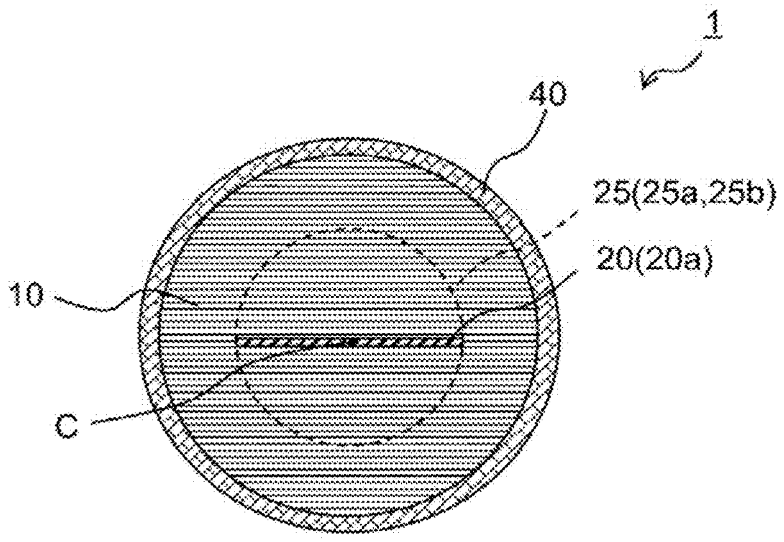
FIG. 2 is a cross-sectional view along the line II-II of FIG. 1.

FIG. 1 is a cross-sectional view showing a smoking device cartridge according to a first embodiment, and FIG. 2 is a cross-sectional view along the line II-II of FIG. 1.

As shown in FIGS. 1 and 2, a smoking device cartridge 1 according to the first embodiment includes aerosol-forming substrates 10, a first susceptor 20, a second susceptor 25, a mouthpiece 30, and a packaging member 40. The first susceptor 20 is located inside the aerosol-forming substrates 10. The second susceptor 25 is located on one end (right end in FIG. 1) of the aerosol-forming substrates 10 in the longitudinal direction of the aerosol-forming substrates 10. The mouthpiece 30 is located on one end of the second susceptor 25 in the longitudinal direction of the second susceptor 25. The packaging member 40 is a sheet-like member made of, for example, paper, and integrally wraps the aerosol-forming substrates 10, the first susceptor 20, the second susceptor 25, and the mouthpiece 30.

The smoking device cartridge 1 shown in FIG. 1, for example, is formed with a diameter of 6.5 to 7.5 mm and a length of 40 to 60 mm. Of course, the smoking device cartridge 1 may also be formed with dimensions other than these.

The aerosol-forming substrates 10 are configured of a large number of strip-shaped members made of tobacco plants or non-tobacco plants. These aerosol-forming substrates 10 generate aerosol when heated by the first susceptor 20. The raw materials for the aerosol-forming substrates 10 will be described later.

The first susceptor 20 is configured of a sheet-like magnetic material 20*a*. An induced current flows through the first susceptor 20 based on the generation of an alternating magnetic field by an induction heating type smoking device. This causes the first susceptor 20 to generate heat to heat the aerosol-forming substrates 10. The magnetic material (hereinafter, referred to as "first magnetic material") 20*a* contained in the first susceptor 20 will be described later.

The second susceptor 25 is located between the aerosol-forming substrates 10 and the mouthpiece 30, and is spaced apart from the first susceptor 20. This second susceptor 25 is formed by solidifying magnetic materials 25*a* in a powder or granular form into a columnar shape via an adhesive 25*b* (e.g. paste or wax), and these magnetic materials 25*a* are located at high density in the second susceptor 25. The outer diameter of the second susceptor 25 is approximately half of the inner diameter of the packaging member 40 wound in a cylindrical shape.

The second susceptor 25 generates a magnetic field around the first susceptor 20 by being magnetized based on the generation of an alternating magnetic field by the induction heating type smoking device. Due to generating the magnetic field by the second susceptor 25 in addition to the alternating magnetic field generated by the induction heating type smoking device, the induction heating of the first susceptor 20 can be stabilized even when the first susceptor 20 becomes high temperature. One end and the other end of the second susceptor 25 are adhesively bonded with an adhesive (e.g. paste or wax) to the aerosol-forming substrates 10 and the mouthpiece 30, respectively. The magnetic material (hereinafter, referred to as "second magnetic material") 25*a* contained in the second susceptor 25 will be described later.

The mouthpiece 30 is a part configuring the smoking device cartridge 1, and is formed, for example, using paper or the like. The mouthpiece 30 may include a cellulose acetate filter or the like for removing particulates. Part of particulates in water vapor and aerosol generated by the aerosol-forming substrates 10 are filtered by the filter of this mouthpiece 30.

Next, general properties about magnetic materials will be described, and then the first magnetic material (magnetic material contained in the first susceptor 20) 20*a* and the second magnetic material (magnetic material contained in the second susceptor 25) 25*a* will be described.

Magnetic materials are broadly classified into ferromagnetic materials, paramagnetic materials, and diamagnetic materials. Ferromagnetic materials strongly exhibit magnetism in the same direction as an external magnetic field when the external magnetic field is applied, and in particular, have the property of being attracted to magnets. Examples of ferromagnetic materials include iron, nickel, cobalt, ferrite, neodymium, heat-resistant neodymium, samarium cobalt, alnico, ferritic stainless steel, martensitic stainless steel, and the like. Relative magnetic permeability of ferromagnetic materials is much larger than 1, for example, the relative magnetic permeability of the iron is about 5000, the relative magnetic permeability of the nickel is about 600, the relative magnetic permeability of the cobalt is about 250, and the relative magnetic permeability of the ferritic stainless steel is about 1000 to 1800.

Paramagnetic materials weakly exhibit magnetism in the same direction as an external magnetic field when the external magnetic field is applied and loses the magnetism when the external magnetic field is reduced to zero, and examples of paramagnetic materials include aluminum, platinum, manganese, chromium, and the like. Relative magnetic permeability of paramagnetic materials is slightly larger than 1, for example, the relative magnetic permeability of the aluminum is about 1.000021, the relative magnetic permeability of the platinum is about 1.000265, and the relative magnetic permeability of the manganese is about 1.000830.

In addition, diamagnetic materials weakly exhibit magnetism in the opposite direction to an external magnetic field when the external magnetic field is applied and loses the magnetism when the external magnetic field is reduced to zero, and examples of diamagnetic materials include copper, graphite, bismuth, and the like. Relative magnetic permeability of diamagnetic materials is slightly smaller than 1, for example, the relative magnetic permeability of the copper is about 0.999990, the relative magnetic permeability of the graphite is about 0.99980, and the relative magnetic permeability of the bismuth is about 0.999834.

When an alternating magnetic field is generated around a ferromagnetic material, an induced current flows through the ferromagnetic material to generate Joule heat. Since heat (hysteresis loss) is generated due to friction and vibration between molecules, the ferromagnetic material is easily inductively heated compared to paramagnetic materials and diamagnetic materials, and can sufficiently heat the aerosol-forming substrates 10. It should be noted that even when the paramagnetic material or the diamagnetic material is used instead of the ferromagnetic material, induction heating is still possible. Nevertheless, from the perspective of shortening the time required for sufficient heating of the aerosol-forming substrates 10 and reducing power consumption, it is preferable to use the ferromagnetic material.

In addition, ferromagnetic materials have a high Curie temperature. Herein, the Curie temperature refers to a temperature at which ferromagnetic materials change to paramagnetic materials. For example, the Curie temperature of iron is about 770 degree Celsius, the Curie temperature of nickel is about 358 degree Celsius, and the Curie temperature of cobalt is about 1115 degree Celsius.

In addition, the Curie temperature of ferrite is about 450 to 500 degree Celsius. The Curie temperature of neodymium is about 300 to 310 degree Celsius. The Curie temperature of heat-resistant neodymium is about 500 to 600 degree Celsius. The Curie temperature of samarium cobalt is about 700 to 750 degree Celsius. The Curie temperature of alnico is about 850 to 860 degree Celsius. Herein, ferrite is made of iron oxide powder as a raw material, and tends to be selected because ferrite is well known. Neodymium has an aspect of being weak to heat and easily rusting, but has advantages of having a high magnetic energy product and being inexpensive, and therefore, it is possible to manufacture the smoking device cartridge capable of stably performing induction heating at low cost. Samarium cobalt has a high magnetic energy product, and the production amount of raw materials of samarium cobalt is less than that of neodymium. Samarium cobalt has an aspect of being expensive, but is excellent in terms of thermal stability and corrosion resistance. Alnico is made of aluminum, nickel, and cobalt as raw materials, and is excellent in that alnico is resistant to high temperature and is not easily cracked because alnico has a high Curie temperature.

Furthermore, the Curie temperature of $NiOFe_2O_3$ is about 585 degree Celsius, the Curie temperature of $CuOFe_2O_3$ is about 455 degree Celsius, and the Curie temperature of $MgOFe_2O_3$ is about 440 degree Celsius. Consequently, when the smoking device cartridge 1 is mounted in the induction heating type smoking device and heated at a high temperature of, for example, about 300 to 350 degree Celsius, in the case of induction heating of the above-mentioned ferromagnetic materials, the heating temperature generally does not reach the Curie temperature. As a result, the property as ferromagnetic materials can be maintained, and the aerosol-forming substrates 10 can be stably heated.

Unfortunately, depending on the performance of the induction heating type smoking device, there were cases where the heating temperature reached about 350 to 400 degree Celsius when the smoking device cartridge 1 is heated at the high temperature of about 300 to 350 degree Celsius as described above. In this case, since the temperature of the first susceptor 20 becomes equal to or higher than its Curie temperature, the first susceptor 20 cannot maintain its property as the ferromagnetic material, and there were cases where the induction heating of the first susceptor 20 cannot be stably performed.

In the present embodiment, ferromagnetic materials are used as the first magnetic material 20*a* and the second magnetic material 25*a*, and the Curie temperature of the second magnetic material 25*a* is set to be higher than the Curie temperature of the first magnetic material 20*a*. Consequently, even if the first magnetic material 20*a* reaches its Curie temperature when the smoking device cartridge 1 is heated at the high temperature as described above, the second magnetic material 25*a* can maintain its property as the ferromagnetic material without reaching its Curie temperature. Therefore, it is still possible to generate the magnetic field by the second susceptor 25 in addition to the alternating magnetic field by the induction heating type smoking device, and a sufficient induced current flows through the first susceptor 20 to stably perform induction heating.

As a preferable example of the first magnetic material 20*a* and the second magnetic material 25*a*, nickel can be used as the first magnetic material 20*a* and iron can be used as the second magnetic material 25*a*. In this case, since the Curie temperature of iron (about 770 degree Celsius) is higher than the Curie temperature of nickel (about 358 degree Celsius), it is possible to stably perform induction heating of the first susceptor 20 as described above. Furthermore, as a preferable example of the first magnetic material 20*a* and the second magnetic material 25*a* in consideration of avoiding local heating or prevention of combustion of the aerosol-forming substrates 10, neodymium can be used as the first magnetic material 20*a* and nickel can be used as the second magnetic material 25*a*. Additionally, the first magnetic material 20*a* and the second magnetic material 25*a* are not limited to the above-mentioned ferromagnetic materials, and may, for example, be an alloy of iron and nickel, or an alloy of iron, nickel, and chromium.

In the present embodiment, the Curie temperature of the second magnetic material 25*a* is set to be higher than the upper limit of the heating temperature of the induction heating type smoking device. Consequently, when the smoking device cartridge 1 is heated at the high temperature as described above, the second magnetic material 25*a* can always maintain its property as the ferromagnetic material. Therefore, a sufficient induced current reliably flows through the first susceptor 20 to stably perform induction heating.

Next, specific examples of tobacco plants or non-tobacco plants, which are raw materials used as the aerosol-forming substrates 10, will be described. The aerosol-forming substrates 10 is configured of any one of the following raw materials or a combination of two or more of the following raw materials.

Examples of the tobacco plants include tobacco leaves, tobacco stems, expanded tobacco, homogenized tobacco, and the like. The non-tobacco plants refer to plants other than the tobacco plants. Examples of preferred parts of the non-tobacco plants include leaves, fruit pulp, seeds, roots (scale roots, tuberous roots, etc.), stems, tubers, barks (stem barks, tree barks, etc.), flowers (petals, stamens, pistils, etc.), trunks, branches, and the like.

Herein, “plants” in the present specification refer to a group of organisms distinct from animals, and includes not only organisms that have roots and live in fixed locations, such as grass and trees, but also algae such as microalgae and seaweed, fungi such as mushrooms, and the like.

The aerosol-forming substrates 10 is formed into a strip shape by, for example, appropriately mixing an aerosol former to generate aerosols, microcrystalline cellulose, flavoring additives, preservatives, and binders or thickeners with dried and ground non-tobacco plants, grinding or classifying the mixture to form into powder, granules, or sheets, and then cut to have a predetermined width and length.

For example, in the case that the part of the non-tobacco plants are leaves, tea can preferably be used. Tea can vary based on not only different plants that can be used for making tea, but also different processing methods for making tea even from the same plant. Specific examples thereof include, for example, Japanese tea, black tea, Hydrangea macrophylla tea, Hydrangea macrophylla tea, Gynostemma pentaphyllum tea, aloe tea, ginkgo leaf tea, oolong tea, turmeric tea, Quercus salicina tea, Eleutherococcus senticosus tea, Plantago asiatica tea, Glechoma hederacea tea, persimmon leaf tea, kamitsure tea, chamomile tea, Kawara Ketsumei tea, Chinese quince tea, chrysanthemum flower tea, gymnema tea, guava tea, Chinese wolfberry fruit tea, mulberry leaf tea, black soybean tea, Geranium thunbergii tea, brown rice tea, burdock tea, comfrey tea, kelp tea, cherry blossom tea, saffron tea, shiitake mushroom tea, perilla tea, Jasmine tea, ginger tea, Equisetum arvense tea, Acorus gramineus tea, Swertia japonica tea, Fagopyrum esculentum tea, Aralia elata tea, dandelion tea, sweet tea, Houttuynia cordata tea, Eucommia ulmoides tea, sword bean tea, elderberry tea, nezumimochi tea, adlay tea, senna tea, loquat leaf tea, pu’er tea, safflower tea, pine needle tea, mate tea, barley tea, Acer maximowiczianum tea, mugwort tea, eucalyptus tea, eucalyptus tea, Siraitia grosvenorii tea, bitter melon tea, and the like. The tea residues after drinking may be used as these teas. By using the tea residues or the like, it is possible to recycle and effectively utilize expensive teas, etc.

Furthermore, extracts, so-called essences, or processed products of the non-tobacco plants exemplified above may be used. Examples of the form of the extracts include liquids, syrup-like substances, powders, granules, solutions, and the like.

Examples of the aerosol former as raw materials for the aerosol-forming substrates 10 include glycerin, propylene glycol, sorbitol, triethylene glycol, lactic acid, diacetin (glyceryl diacetate), triacetin (glyceryl triacetate), triethylene glycol diacetate, triethyl citrate, isopropyl myristate, methyl stearate, dimethyl dodecanedioate, dimethyl tetradecanedioate, and the like. Among these, glycerin and propylene glycol are preferable.

The microcrystalline cellulose as raw materials for the aerosol-forming substrates 10 is, for example, obtained by partially depolymerizing the α-cellulose derived from fibrous plant pulp with acid. The microcrystalline cellulose is obtained by removing the soluble component from the cellulose and appropriately crystallizing the insoluble component.

The microcrystalline cellulose may be in a form of a powder, or may be in a form of a suspension in which the microcrystalline cellulose is dispersed in a solvent such as water. In the latter case, a high-speed stirrer, a high-pressure homogenizer, or the like can be used for the dispersion in the solvent.

Furthermore, a flavoring additive may preferably be used as needed to add flavor as a raw material of the aerosol-forming substrates 10. Examples of the flavoring additives include extracts of peppermint, cocoa, coffee and black tea, powdered catechin of tea extract, and the like. As the preservatives, those used in food are preferable, and examples of the preservatives include sorbic acid, potassium sorbate, benzoic acid, sodium benzoate, and the like.

The aerosol-forming substrates 10 may contain menthol and a water-insoluble crosslinked polymer (preferably polyvinylpolypyrrolidone). Combining the menthol with the water-insoluble crosslinked polymer effectively prevents sublimation of the menthol, and allows the menthol flavor to be kept for a long period of time. The menthol herein includes not only those obtained from natural sources but also those synthesized. The aerosol-forming substrates 10 may contain peppermint, mint, peppermint oil, or other menthols.

The flavoring additive is provided in the mouthpiece 30 by impregnating a wall portion of the mouthpiece 30 with the flavoring additive, for example. The manner in which the flavoring additive is provided in the mouthpiece 30 is not limited to this manner. For example, the flavoring additive may be provided in the mouthpiece 30 by embedding a capsule in which the flavoring additive is encapsulated in the wall portion of the mouthpiece 30. Alternatively, the flavoring additive may be located around the second susceptor 25. In the case that the flavoring additive is encapsulated in the capsule, a smoker can break the capsule by pressing the capsule with his or her fingers, and it is possible to cause the aromatic components of the flavoring additive to be volatilized at a preferred timing.

In the case that the flavoring additive is encapsulated in microcapsules, for example, the microcapsules in which the flavoring additive is encapsulated may be located inside the aerosol-forming substrates 10.

Examples of the binders or the thickeners as raw materials for the aerosol-forming substrates 10 include guar gum, xanthan gum, gum such as arabic gum, locust bean gum, etc., cellulose binder such as hydroxypropyl cellulose, carboxymethyl cellulose, hydroxyethyl cellulose, methyl cellulose, ethyl cellulose, etc., starch, organic acid such as alginic acid, etc., sodium alginate, sodium carboxymethyl cellulose, carrageenan, polysaccharides such as agar, pectin, salt of conjugate base of organic acid, etc., and combinations thereof.

Method for Producing Aerosol-Forming Substrates

The method for producing the aerosol-forming substrates 10 described above will be described separately for each step. The manufacturing process of the aerosol-forming substrates 10 includes a drying and pulverizing step of drying and pulverizing tobacco or non-tobacco plants as main raw materials and weighing the materials, a preparation step of pre-treating and weighing other raw materials, a mixing step of mixing the raw materials to form a composition, and a filling material molding step of molding the composition.

In the drying and pulverizing step, portions (e.g. leaves, seeds, dried fruits, stems, tree barks, roots, or the like) for use of the tobacco or non-tobacco plants as the main raw materials are processed into predetermined pulverized materials to prepare the composition. In this case, it is preferable to adjust the water content to a suitable level for absorbing or supporting the aerosol former, water, and other components to be added later. It is preferable that the drying temperature is 60 degree Celsius or more and 80 degree Celsius or less. By maintaining this temperature range, it is easier to reach the desired water content while avoiding the loss of required flavor components. Additionally, the drying and pulverizing step may include a sieving step of sieving the pulverized materials, and it is possible to adjust the pulverized materials to desired particle size and introduce the adjusted materials into the mixing step.

In the preparation step, the raw materials necessary for producing aerosol-forming substrates 10 can be prepared. The above-mentioned microcrystalline cellulose is weighed in the preparation step and introduced into the mixing step.

In the mixing step, a conventional mixer can be used. For example, an embodiment in which raw materials in a mixing tank are mixed with a stirring blade while applying a shearing force is preferably used.

In the filling material molding step, the strip-shaped aerosol-forming substrates 10 are molded by forming the composition, in which the various raw materials are mixed, into a thin sheet and cutting the sheet. In the present embodiment, three roll mills are prepared to form the thin sheet. By using the three roll mills, it is possible to form the sheet of desired thickness with a doctor blade while performing kneading, dispersion, etc. by the compression due to being forced into the narrow gap between the rolls and the shearing due to the speed difference of the rolls, which is preferable. It is also possible to form the sheet using a press roller or a press machine.

In the filling material molding step, other means may be used, such as molding the composition by passing the composition through an orifice under pressure. As needed, a non-tobacco plant, an aerosol former, binders or thickeners, flavor additives, or preservatives may be further added, and water or the like may also be added.

The thickness of the sheet obtained in the filling material molding step is preferably in the range of 0.1 mm to 1.0 mm, more preferably in the range of 0.1 mm to 0.5 mm. The obtained sheet is cut into a predetermined width with a cutter, a rotary blade type rotary cutter, or the like.

In the case of imparting adhesiveness to the surface of the aerosol-forming substrates 10 formed in the strip shape, means for imparting adhesiveness is not particularly limited, and the above-described binder may be attached to at least part of the surface.

Method of Using Smoking Device Cartridge

Figure 3:
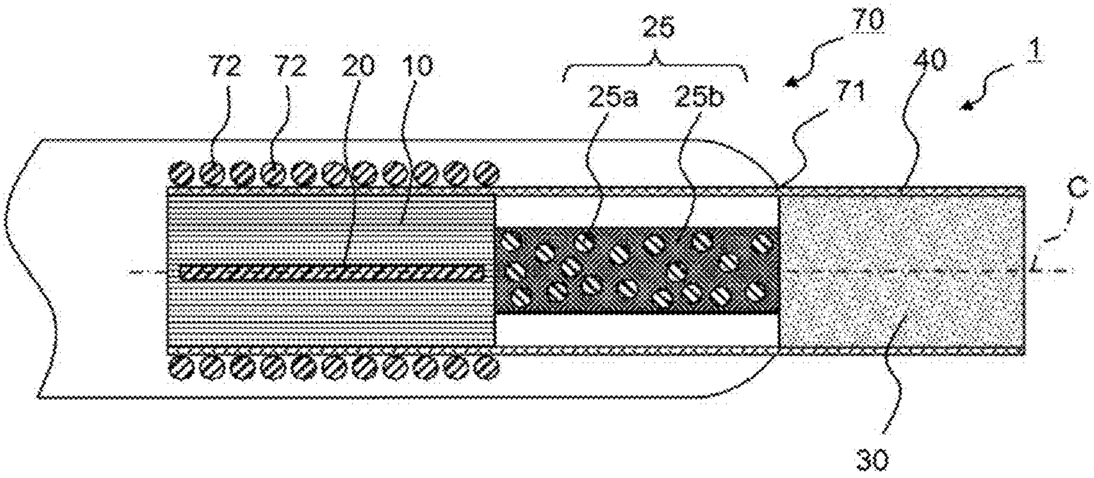
FIG. 3 is a cross-sectional view showing a state that the smoking device cartridge shown in FIG. 1 is mounted in an induction heating type smoking device.

Next, with reference to FIG. 3, the method of using the smoking device cartridge 1 will be described. FIG. 3 is a cross-sectional view showing the state that the smoking device cartridge 1 is mounted in the smoking device 70.

As shown in FIG. 3, the smoking device cartridge 1 is used by being mounted in the induction heating type smoking device 70. The smoking device 70 includes an insertion section 71 for inserting the smoking device cartridge 1, a coil 72 internally wound in a cylindrical shape around the insertion section 71, and a circuit board (not shown) including a CPU for controlling an alternating current to flow through the coil 72. When the smoking device cartridge 1 is inserted into the insertion section 71, the aerosol-forming substrates 10 and the first susceptor 20 are positioned inside the coil 72. When the switch of the smoking device 70 is turned on in this state, the alternating current flows through the coil 72 under the control of the CPU, and an alternating magnetic field is generated so as to penetrate the first susceptor 20.

When the alternating current flows through the coil 72 and the second susceptor 25 side of the coil 72 becomes an N pole, the coil 72 side of the second susceptor 25 becomes an S pole. Inside the coil 72, the direction of the alternating magnetic field generated by the coil 72 becomes left to right, and the direction of the magnetic field generated by the second susceptor 25 becomes also left to right. On the other hand, when the second susceptor 25 side of coil 72 becomes an S pole, the coil 72 side of the second susceptor 25 becomes an N pole. Inside the coil 72, the direction of the alternating magnetic field generated by the coil 72 becomes right to left, and the direction of the magnetic field generated by the second susceptor 25 becomes also right to left. In either case, the direction of the magnetic field generated by the second susceptor 25 corresponds with the direction of the alternating magnetic field generated by the coil 72, and the alternating magnetic field inside the coil 72 is strengthened by the contribution of the magnetic field of the second susceptor 25. It should be noted that the second susceptor 25 in the present embodiment is configured to contain the second magnetic material **25*a* to avoid magnetic saturation inside the coil 72, it does not occur that the aerosol-forming substrates 10 do not become unheatable during the use of a smoking device cartridge 1**.

The alternating magnetic field is generated inside the coil 72, Joule heat is generated by the induced current flowing through the first susceptor 20, heat is generated due to hysteresis loss, and thereby, the first susceptor 20 is inductively heated. Then, heat is transferred from the first susceptor 20 to each of the aerosol-forming substrates 10, and thereby, each of the aerosol-forming substrates 10 is heated to generate aerosol. Even if the temperature of the first magnetic material 20*a* reaches its Curie temperature, the second magnetic material 25*a* does not reach its Curie temperature, and it is possible to perform stable induction heating of the first susceptor 20. In this state, when the smoker holds the mouthpiece 30 in his or her mouth and inhales, the aerosol flows through the mouthpiece 30, and flows into the smoker's mouth.

According to the smoking device cartridge 1 of the first embodiment configured as described above, the following effects can be achieved.

Since the Curie temperature of the second magnetic material 25*a* is higher than the Curie temperature of the first magnetic material 20*a*, even if the first magnetic material 20*a* reaches its Curie temperature when the smoking device cartridge 1 is heated at the high temperature of, for example, about 300 to 350 degree Celsius, the second magnetic material 25*a* can maintain its property as the ferromagnetic material without reaching the Curie temperature of the second magnetic material 25*a*. Consequently, it is possible to continuously generate the magnetic field by the second susceptor 25 in addition to the alternating magnetic field by the induction heating type smoking device, and the sufficient induced current flows through the first susceptor 20 so that the induction heating is stably performed. The aerosol-forming substrates 10, therefore, can be stably heated.

The above-mentioned second susceptor 25 is located between the aerosol-forming substrates 10 and the mouthpiece 30, and is spaced apart from the first susceptor 20. Thus, even when the first susceptor 20 is inductively heated, the heat is not directly transferred to the second susceptor 25.

The above-described second susceptor 25 is formed by solidifying the second magnetic material 25*a* in the powder or granular form into the columnar shape via the adhesive 25*b*, the second susceptor 25 generates the magnetic field effective for induction heating around the first susceptor 20 by being magnetized based on the generation of the alternating magnetic field by the induction heating type smoking device.

Since the above-mentioned second magnetic material 25*a* is made of iron, cobalt, or ferritic stainless steel, all of the Curie temperatures of these materials are higher than the heating temperature (about 300 to 350 degree Celsius) of the induction heating type smoking device. Thus, it is possible to prevent the second magnetic material 25*a* from reaching its Curie temperature.

The Curie temperature of the above-described second magnetic material 25*a* is set to be higher than the upper limit of the heating temperature of the induction heating type smoking device 70. Consequently, when the smoking device cartridge 1 is heated at the high temperature, the second magnetic material 25*a* can always maintain its property as the ferromagnetic material. As a result, it is possible to stably generate the magnetic field by the second susceptor 25 in addition to the alternating magnetic field by the induction heating type smoking device, and ensure that the sufficient induced current flows through the first suscepter for stable induction heating.

Modified Example 1-1

Figure 4:
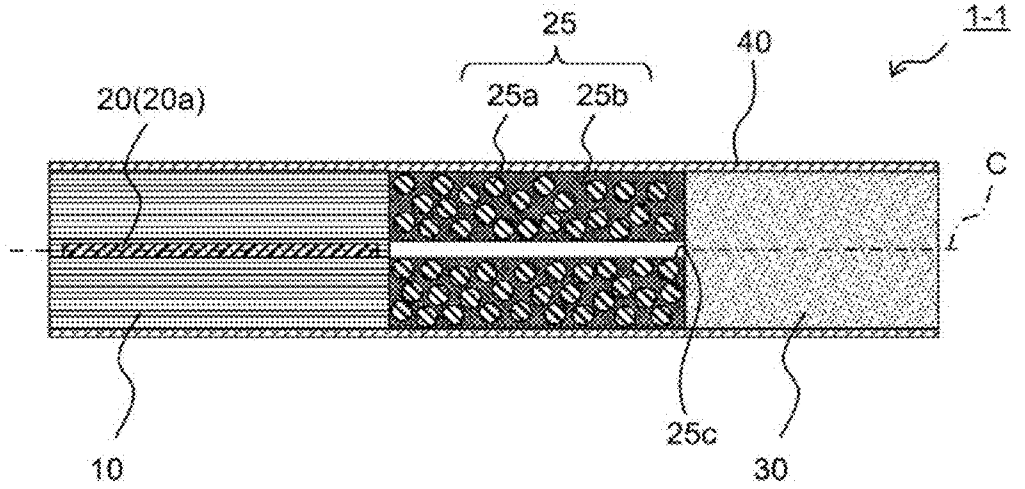
FIG. 4 is a cross-sectional view showing a smoking device cartridge according to Modified Example 1-1 of the first embodiment.

Next, with reference to FIG. 4, a smoking device cartridge according to Modified Example 1-1 of the first embodiment will be described. FIG. 4 is a cross-sectional view showing the smoking device cartridge according to Modified Example 1-1.

As shown in FIG. 4, the smoking device cartridge 1-1 according to Modified Example 1-1 is different from the smoking device cartridge according to the first embodiment in that the size of the second susceptor 25 is larger. Specifically, the outer diameter of the second susceptor 25 formed in a columnar shape is approximately equal to the inner diameter of the packaging member 40.

Furthermore, in the second susceptor 25, a hole portion 25*c* extending along the central axis C of the smoking device cartridge 1-1 is formed. The aerosol generated by heating the aerosol-forming substrates 10 can pass through the hole portion 25*c* toward the mouthpiece 30.

According to the smoking device cartridge 1-1 configured as described above, approximately the same effects as that in the first embodiment can be achieved.

In addition, since the outer diameter of the second susceptor 25 is substantially equal to the inner diameter of the packaging member 40, it is possible to intensify the magnetic field generated around the first susceptor 20 more than in the above-mentioned first embodiment, and thereby, the induction heating of the first susceptor 20 can be easily performed.

Modified Example 1-2

Figure 5:
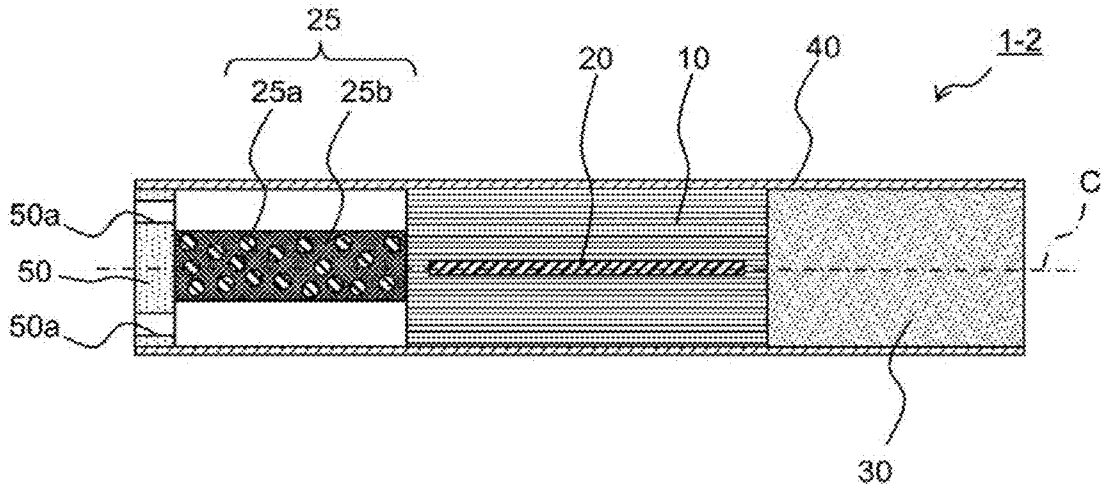
FIG. 5 is a cross-sectional view showing a smoking device cartridge according to Modified Example 1-2 of the first embodiment.

Next, with reference to FIG. 5, a smoking device cartridge according to Modified Example 1-2 of the first embodiment will be described. FIG. 5 is a cross-sectional view showing the smoking device cartridge according to Modified Example 1-2.

As shown in FIG. 5, the smoking device cartridge 1-2 according to Modified Example 1-2 is different from the smoking device cartridge according to the first embodiment in that the second susceptor 25 is located on the other end (left end in FIG. 5) of the first susceptor 20.

Similarly to the first susceptor 20, the second susceptor 25 is located on the central axis C of the smoking device cartridge 1-2. One end part of the second susceptor 25 is adhesively bonded to the other end part of the aerosol-forming substrates 10 via an adhesive.

A disk-shaped lid member 50 is located on the other end of the second susceptor 25 so as to close the tip of the smoking device cartridge 1-2. Hole portions 50*a* are formed in lid member 50 so that air can flow into the smoking device cartridge through the hole portions 50*a*. While the lid member 50 shown in FIG. 5 has multiple hole portions 50*a*, the lid member 50 may have a single (one) hole portion 50*a*. The size of the lid member 50 is, for example, set to have a diameter of 4.0 mm to 7.5 mm and a length in the height direction of 3.0 to 7.0 mm. Similarly to the mouthpiece 30, the lid member 50 may be formed in a circular tube shape by winding a sheet-like member made of, for example, paper. The lid member 50 configured as described above functions to allow air to pass toward the aerosol-forming substrates 10 through the hole portions 50*a* from the outside of the smoking device cartridge 1-2. The above-mentioned lid member 50 can absorb residual liquid that has remained and liquefied in the aerosol-forming substrates 10, the residual liquid originating from the water vapor and aerosol generated in the aerosol-forming substrate 10. By making the lid member 50 a different color (e.g. black) compared to the mouthpiece 30, it is possible to easily distinguish between the upstream and downstream sides of the smoking device cartridge 1-2.

According to the smoking device cartridge 1-2 configured as described above, approximately the same effects as that in the first embodiment can be achieved.

In addition, since the second susceptor 25 and the first susceptor 20 are located on the central axis C of the smoking device cartridge 1-2, the first susceptor 20 can be prevented from falling out of the smoking device cartridge 1-2 by the second susceptor 25.

Modified Example 1-3

Figure 6:
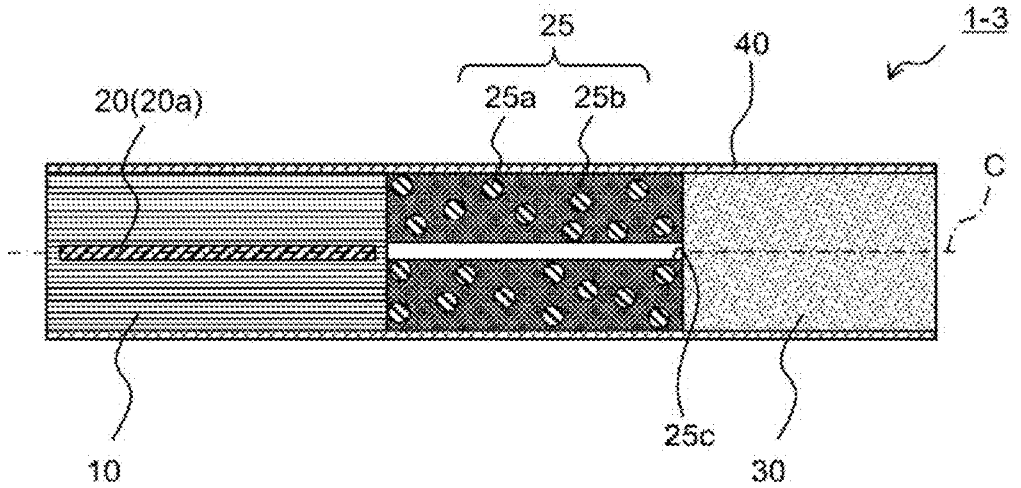
FIG. 6 is a cross-sectional view showing a smoking device cartridge according to Modified Example 1-3 of the first embodiment.

Next, with reference to FIG. 6, a smoking device cartridge according to Modified Example 1-3 of the first embodiment will be described. FIG. 6 is a cross-sectional view showing the smoking device cartridge according to Modified Example 1-3.

As shown in FIG. 6, the smoking device cartridge 1-3 according to Modified Example 1-3 is different from the smoking device cartridge according to the first embodiment in that the second magnetic material 25*a* having a low density is contained in the second susceptor 25.

The second susceptor 25 is formed by solidifying second magnetic materials 25*a* in a powder or granular form into a columnar shape via an adhesive 25*b*. The density of the second magnetic materials 25*a* is, for example, within the range of 0.5 $g/cm^3$ to 8.0 $g/cm^3$.

In the case that the first susceptor 20 reached its Curie temperature during use of a conventional smoking device cartridge without the second susceptor 25, due to the transition of the first susceptor 20 to the paramagnetic material, a magnetic detection means (e.g. a magnetic sensor or a sensor detecting frequency variations of electromagnetic waves) (not shown) provided in the induction heating type smoking device became unable to detect the magnetic field, which caused the alternating current not to flow through the coil 72 (refer to FIG. 3). As a result, the aerosol-forming substrates 10 could not be heated stably.

According to the smoking device cartridge 1-3 of the present modified example, the second susceptor 25 as a pseudo first susceptor for generating the magnetic field is spaced apart from the first susceptor 20, and the density of the second magnetic material 25*a* in this second susceptor 25 is set to the low density. As a result, it is possible to prevent the second susceptor 25 from generating heat during use of the smoking device cartridge 1-3. Additionally, it is possible to cause the magnetic detection means in the induction heating type smoking device to continuously detect the magnetic field by the ferromagnetic material (second magnetic material 25*a*), and thereby, it is possible to cause the alternating current to continuously flow through the coil 72 (refer to FIG. 3). Since it is possible to continuously generate the alternating magnetic field inside the coil 72, the induction heating of the first susceptor 20 can be stably performed, and thereby, the aerosol-forming substrates 10 can be stably heated. In the smoking device cartridge 1-3 according to the present modified example, since generating heat is prevented as described above, the Curie temperature of the second magnetic material 25*a* may not be higher than the Curie temperature of the first magnetic material 20*a*.

In the above description, the second susceptor 25 has the specific configuration in which the magnetic materials 25*a* formed in the powder or granular form are solidified in the columnar shape via the adhesive 25*b*, however, configurations of the second susceptor 25 are not limited to the aforementioned specific configuration. Silicone may be used instead of the adhesive 25*b*. In this case that, for example, a powdery iron alloy is used as the second magnetic material 25*a*, the weight ratio of the iron alloy to silicone may be set to 50% to 50%. Alternatively, paper may be used instead of the adhesive 25*b* to improve air permeability. In this case, the paper containing the magnetic material 25*a* may be wound in a spiral shape, and the paper in this state may be positioned between the aerosol-forming substrates 10 and the mouthpiece 30.

Second Embodiment

Figure 7:
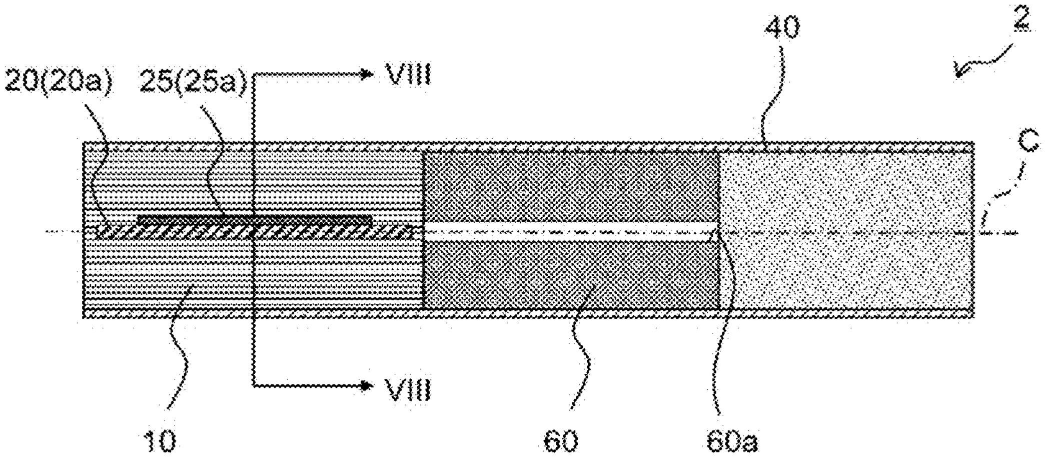
FIG. 7 is a cross-sectional view showing a smoking device cartridge according to a second embodiment.

Next, with reference to FIGS. 7 to 9, a smoking device cartridge according to a second embodiment will be described. FIG. 7 is a cross-sectional view showing the smoking device cartridge according to the second embodiment, FIG. 8 is a cross-sectional view along the line VIII-VIII of FIG. 7, and FIG. 9 is a perspective view showing a second susceptor shown in FIG. 7.

Figure 8:
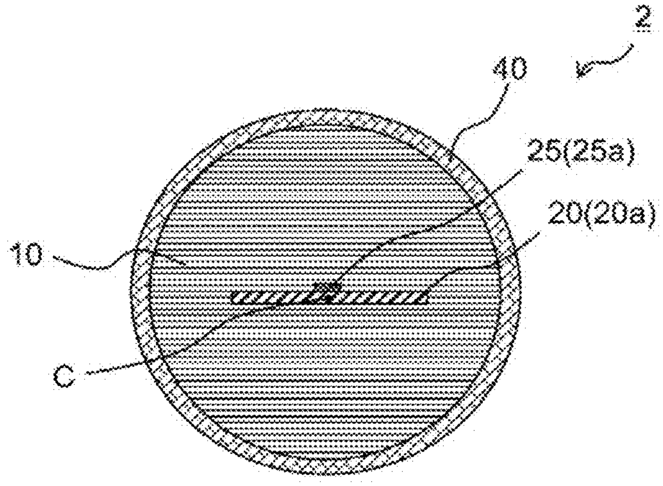
FIG. 8 is a cross-sectional view along the line VIII-VIII of FIG. 7.
Figure 9:
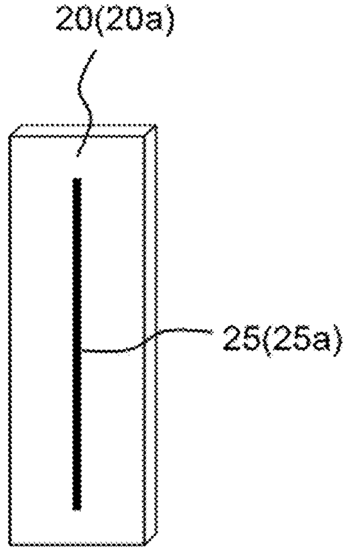
FIG. 9 is a perspective view showing a first susceptor and a second susceptor shown in FIG. 7.

As shown in FIGS. 7 to 9, the smoking device cartridge 2 according to the second embodiment is different from the smoking device cartridge according to the first embodiment in the shape and position of the second susceptor 25. Specifically, the second susceptor 25 is made of the second magnetic material 25*a* formed in a linear shape, is located inside the aerosol-forming substrates 10. The above-described second susceptor 25 is in contact with the front surface (upper surface) of the first susceptor 20 inside the aerosol-forming substrates 10, and extends linearly along the longitudinal direction of the first susceptor 20.

Since the second susceptor 25 is located inside the aerosol-forming substrates 10 as described above, when the smoking device cartridge 2 is mounted in the induction heating type smoking device (refer to FIG. 3), the second susceptor 25, together with the first susceptor 20, is positioned inside the coil. Consequently, based on the generation of the alternating magnetic field by the smoking device, an induced current also flows through the second susceptor 25 so that the induction heating is performed. Even if the first magnetic material 20*a* reaches its Curie temperature when the smoking device cartridge 2 is heated at the high temperature as described above, the induction heating of the first susceptor 20 weakens, while the second magnetic material 25*a* does not reach its Curie temperature, and the induction heating of the second susceptor 25 is stably performed without weakening. In addition, the heat from the second susceptor 25 is transferred to the first susceptor 20, which prevents decrease of the overall temperature of the first susceptor 20 and the second susceptor 25.

The support member 60, which supports the aerosol-forming substrates 10, is located on one end of the aerosol-forming substrates 10. The support member 60 is made of, for example, silicone, paper, plastic, porous materials, or the like. In the support member 60, a hole portion 60*a* extending along the central axis C of the smoking device cartridge 2 is formed so that aerosol can pass through the hole portion 60*a*. The support member 60 is capable of preventing positional displacement of the aerosol-forming substrates 10, preventing the packaging member 40 from being hollowed inward, and cooling the aerosol.

According to the smoking device cartridge 2 of the second embodiment configured as described above, approximately the same effects as that in the first embodiment can be achieved.

The above-mentioned second susceptor 25 is located inside the aerosol-forming substrates 10 and in contact with the surface of the first susceptor 20. Even if the first magnetic material 20*a* reaches its Curie temperature when the smoking device cartridge 2 is heated at the high temperature of, for example, about 300 to 350 degree Celsius, the induction heating of the second susceptor 25 is stably performed without weakening, and decrease of the overall temperature of the first susceptor 20 and the second susceptor 25 is prevented. Consequently, the aerosol-forming substrates 10 can be stably heated.

Since the above-described second susceptor 25 can be manufactured, for example, by simply forming the second magnetic material 25*a* in the linear shape, it is possible to easily manufacture the second magnetic material 25*a*. In addition, since the second susceptor 25 is in contact with the surface of the first susceptor 20 formed in the sheet shape, it is possible to perform the induction heating of the entire first susceptor 20 easily.

Figure 10:
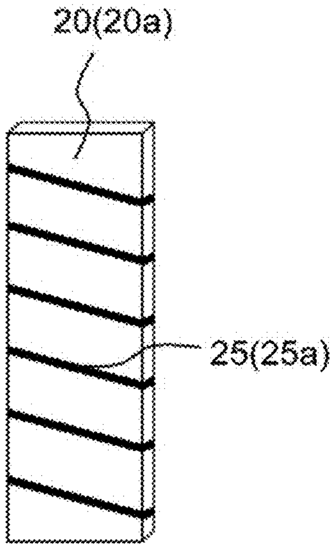
FIG. 10 is a perspective view showing another example of the second susceptor.

In the second embodiment mentioned above, the second susceptor 25 has the specific configuration in which the second susceptor 25 is located linearly on the surface of the first susceptor 20, however, configurations of the second susceptor 25 are not limited to the aforementioned specific configuration. For example, the second susceptor 25 may have a configuration shown in FIG. 10. FIG. 10 is a perspective view showing another example of the second susceptor 25.

As shown in FIG. 10, the second susceptor 25 is formed in a wire shape and wound around the first susceptor 20 at a predetermined pitch, the first susceptor 20 being formed in a sheet shape. According to this configuration, it is possible to increase the contact area with the aerosol-forming substrates 10 as compared with that in the second embodiment, which is effective in heating the aerosol-forming substrates 10.

Hereinafter, modified examples of the second embodiment will be described.

Modified Example 2-1

Figure 11A:
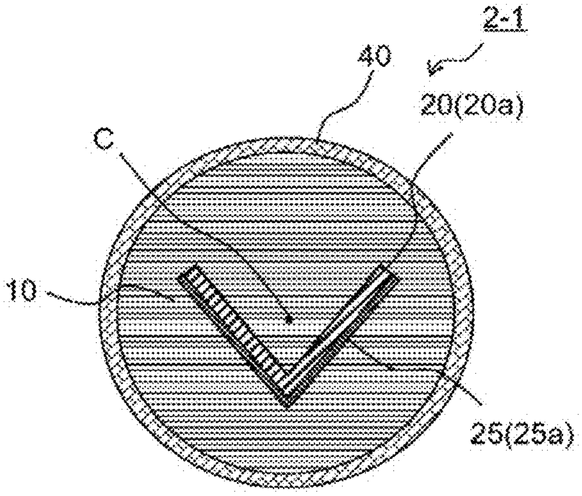
FIG. 11A is a cross-sectional view showing a smoking device cartridge according to Modified Example 2-1 of the second embodiment.

Next, with reference to FIGS. 11A and 11B, a smoking device cartridge according to Modified Example 2-1 will be described. FIG. 11A is a cross-sectional view showing the smoking device cartridge according to Modified Example 2-1, and FIG. 11B is a plan view showing a first susceptor and a second susceptor shown in FIG. 11A.

Figure 11B:
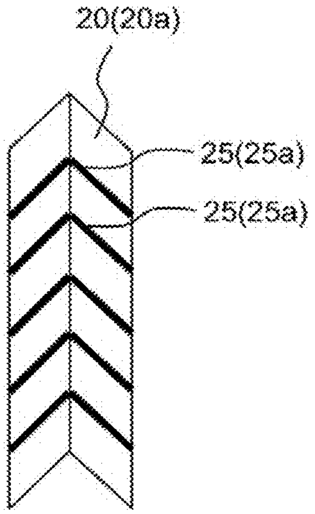
FIG. 11B is a plan view showing a first susceptor and a second susceptor of FIG. 11A.

As shown in FIGS. 11A and 11B, the smoking device cartridge 2-1 according to Modified Example 2-1 is different from the smoking device cartridge according to the second embodiment in the shapes of the first susceptor 20 and the second susceptors 25. Specifically, the first susceptor 20 is formed in a V-shape in the cross sectional view, and the second susceptor 25 is formed in a bent line shape bent into a V-shape. A plurality of such second susceptor 25 (in this example, five) are provided.

The second susceptors 25 are located at predetermined intervals along the longitudinal direction of the first susceptor 20 inside the aerosol-forming substrates 10. The above-described second susceptors 25 are in contact with the back surface (lower surface) of the first susceptor 20 in accordance with the cross-sectional shape of the first susceptor 20.

According to the smoking device cartridge 2-1 configured as described above, approximately the same effects as that in the second embodiment can be achieved.

Since the above-mentioned first susceptor 20 is formed in the V-shape in the cross sectional view, it is possible to increase the contact area with the aerosol-forming substrates 10 as compared with that in the second embodiment, which is effective in heating the aerosol-forming substrates 10.

In addition, since the second susceptors 25 are formed in the bent line shapes bent into the V-shapes and are in contact with the back surface of the first susceptor at the predetermined interval, it is possible to increase the contact area with the first susceptor 20 as compared with that in the second embodiment. Consequently, decrease of the overall temperature of the first susceptor 20 and the second susceptor 25 is further prevented.

Modified Example 2-2

Figure 12A:
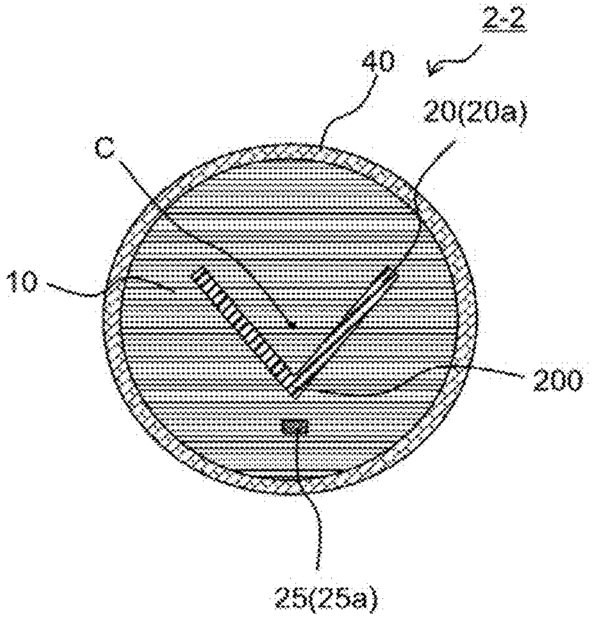
FIG. 12A is a cross-sectional view showing a smoking device cartridge according to Modified Example 2-2 of the second embodiment.

Next, with reference to FIGS. 12A and 12B, a smoking device cartridge according to Modified Example 2-2 will be described. FIG. 12A is a cross-sectional view showing the smoking device cartridge according to Modified Example 2-2, and FIG. 12B is a plan view showing a first susceptor and a second susceptor of FIG. 12A.

Figure 12B:
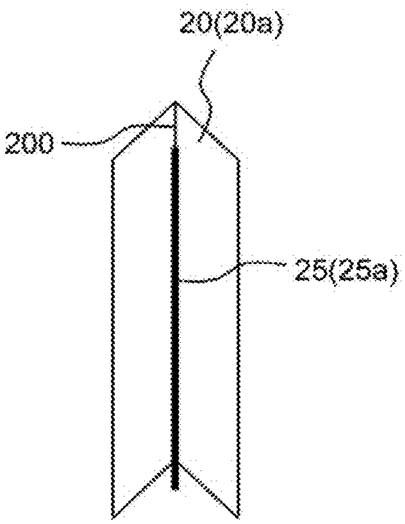
FIG. 12B is a plan view showing a first susceptor and a second susceptor of FIG. 12A.

As shown in FIGS. 12A and 12B, the smoking device cartridge 2-2 according to Modified Example 2-2 is different from the smoking device cartridge according to Modified Example 2-1 in the shape and position of the second susceptor 25. Specifically, the second susceptor 25 is formed in a linear shape, and is spaced apart from the first susceptor 20 inside the aerosol-forming substrates 10. The second susceptor 25 is located linearly along a valley 200 of the first susceptor 20.

According to the smoking device cartridge 2-2 configured as described above, approximately the same effects as that in the second embodiment can be achieved.

Since the above-mentioned second susceptor 25 is located inside the aerosol-forming substrates 10 and is spaced apart from the first susceptor 20, the heat from the first susceptor 20 is not directly transferred to the second susceptor 25.

Since the above-mentioned first susceptor 20 is formed in the V-shape in the cross sectional view, it is possible to increase the contact area with the aerosol-forming substrates 10 as compared with that in the second embodiment, which is effective in heating the aerosol-forming substrates 10.

In addition, since the second susceptor 25 is formed in a linear shape and located linearly along the lower part of the valley portion 200 of the first susceptor 20, it is possible to sufficiently heat a wide area along the longitudinal direction of the aerosol-forming substrates 10.

Modified Example 2-3

Figure 13:
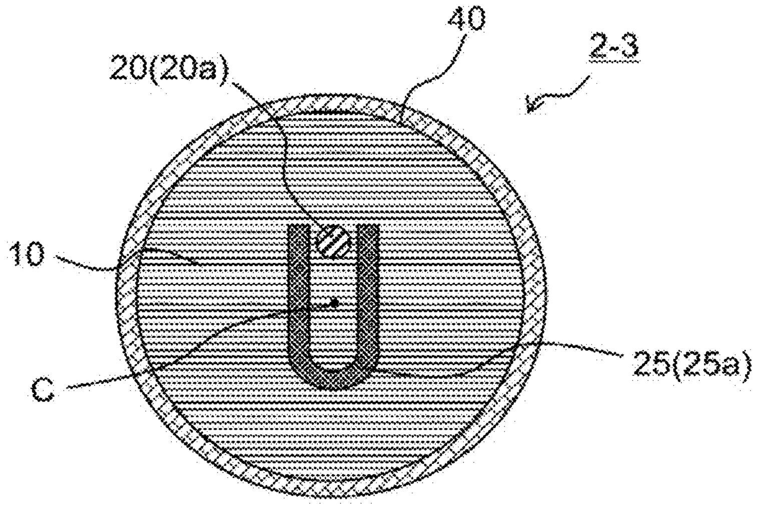
FIG. 13 is a cross-sectional view showing a smoking device cartridge according to Modified Example 2-3 of the second embodiment.

Next, with reference to FIG. 13, a smoking device cartridge according to Modified Example 2-3 will be described. FIG. 13 is a cross-sectional view showing the smoking device cartridge according to Modified Example 2-3.

As shown in FIG. 13, the smoking device cartridge 2-3 according to Modified Example 2-3 is different from the smoking device cartridge according to Modified Example 2-2 in the shapes of the first susceptor 20 and the second susceptor 25. Specifically, the first susceptor 20 is formed in a rod shape and extends along the longitudinal direction of the aerosol-forming substrates 10. On the other hand, the second susceptor 25 is formed in a U-shape in the cross sectional view and extends along the longitudinal direction of the aerosol-forming substrates 10. The first susceptor 20 is located above the central axis of the aerosol-forming substrates 10. The second susceptor 25 is located near the central axis of the aerosol-forming substrates 10, and has open upper ends between which the first susceptor 20 is sandwiched.

According to the smoking device cartridge 2-3 configured as described above, approximately the same effects as that in Modified Example 2-2 can be achieved.

In addition, by the second susceptor 25, it is possible to sufficiently heat the wide area along not only the longitudinal direction of the aerosol-forming substrates 10 but also the short-length direction of the aerosol-forming substrates 10. Thereby, it is possible to prevent uneven heating of the aerosol-forming substrates 10.

Modified Example 2-4

Figure 14:
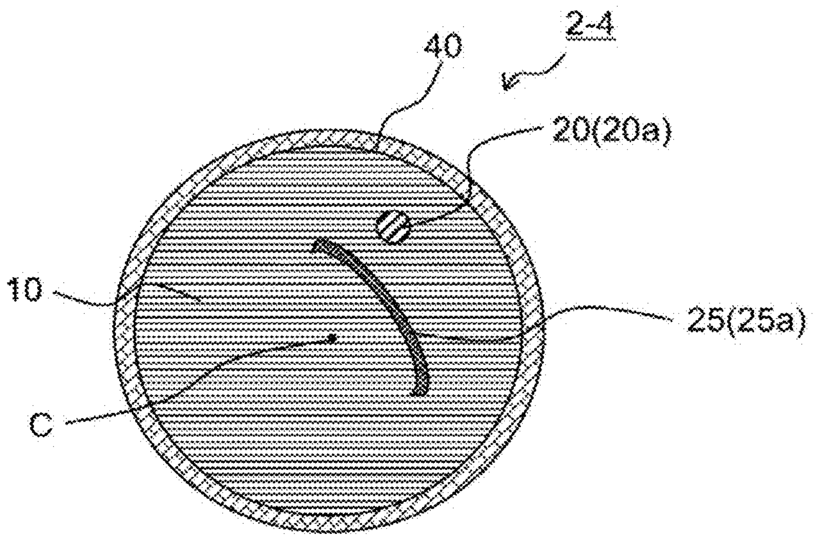
FIG. 14 is a cross-sectional view showing a smoking device cartridge according to Modified Example 2-4 of the second embodiment.

Next, with reference to FIG. 14, a smoking device cartridge according to Modified Example 2-4 will be described. FIG. 14 is a cross-sectional view showing the smoking device cartridge according to Modified Example 2-4.

As shown in FIG. 14, the smoking device cartridge 2-4 according to Modified Example 2-4 is different from the smoking device cartridge according to Modified Example 2-3 in the shape of the second susceptor 25. Specifically, the second susceptor 25 is formed in a curved shape in the cross sectional view and extends along the longitudinal direction of the aerosol-forming substrates 10. In FIG. 14, the second susceptor 25 is positioned substantially from the upper right part to the lower right part in the aerosol-forming substrates 10, the second susceptor 25 being curved outward. As for the first susceptor 20, one first susceptor 20 having the same shape as that of Modified Example 2-3 is provided. This first susceptor 20 is located above the central axis of the aerosol-forming substrates 10 and outside the second susceptor 25.

According to the smoking device cartridge 2-4 configured as described above, approximately the same effects as that in Modified Example 2-3 can be achieved.

In addition, since the second susceptor 25 is formed in the curved shape in the cross sectional view, it is easy to manufacture the second susceptor 25.

Third Embodiment

Figure 15:
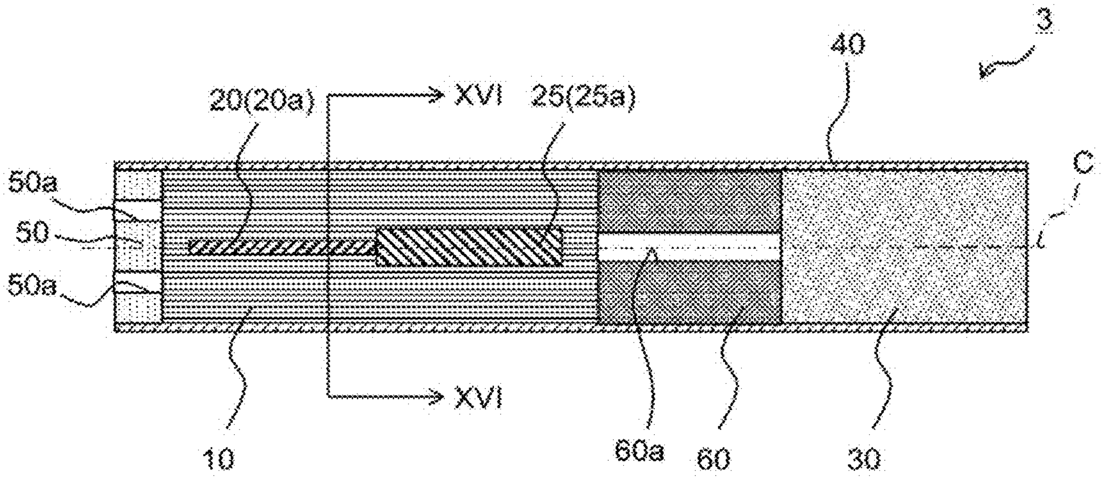
FIG. 15 is a cross-sectional view showing a smoking device cartridge according to a third embodiment.

Next, with reference to FIGS. 15 to 17, a smoking device cartridge according to a third embodiment will be described. FIG. 15 is a cross-sectional view showing the smoking device cartridge according to the third embodiment, FIG. 16 is a cross-sectional view along the line XVI-XVI of FIG. 15, and FIG. 17 is a perspective view showing a configuration of a first susceptor and a second susceptor.

Figure 16:
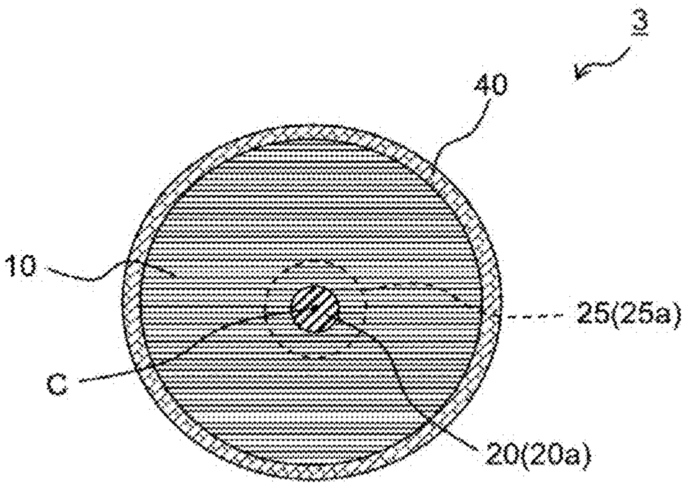
FIG. 16 is a cross-sectional view along the line XVI-XVI of FIG. 15.
Figure 17:
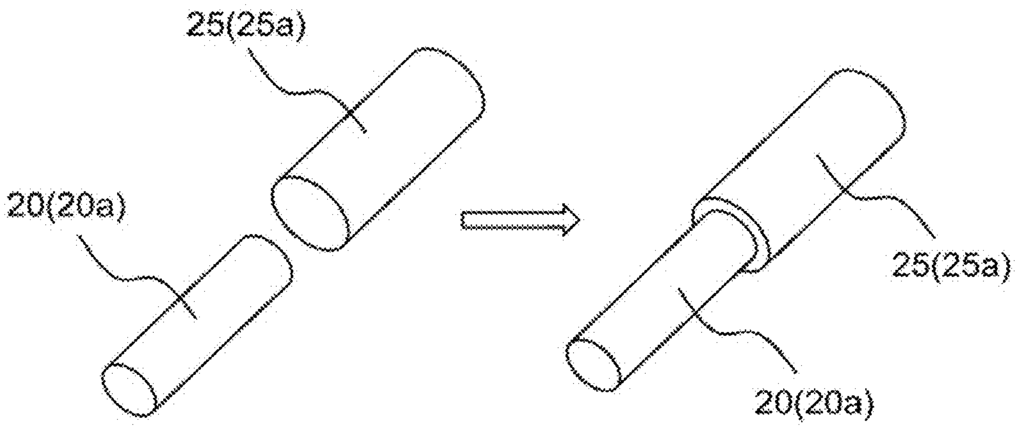
FIG. 17 is a perspective view showing a configuration of a first susceptor and a second susceptor.

As shown in FIGS. 15 to 17, the smoking device cartridge 3 according to the third embodiment is different from the smoking device cartridge according to the second embodiment in the shapes and positions of the first susceptor 20 and the second susceptor 25. Specifically, the first susceptor 20 and the second susceptor 25 are formed in a columnar shape, and the outer diameter of the second susceptor 25 is larger than the outer diameter of the first susceptor 20. The first susceptor 20 and the second susceptor 25 are positioned in line along the longitudinal direction of the aerosol-forming substrates 10. In FIG. 15, the second susceptor 25 is located more downstream in the flow of the aerosol than the first susceptor 20. It should be noted that their positions may be reversed in the case of FIG. 15.

The second susceptor 25 is in contact with the first susceptor 20 inside the aerosol-forming substrates 10. In the present embodiment, the other end part of the second susceptor 25 is thermally coupled to one end part of the first susceptor 20. Herein, the thermal coupling refers to a configuration in which the first susceptor 20 and the second susceptor 25 make thermal contact directly or through a thermal conductor (thermally in contact) with each other so that heat can be transferred between the first susceptor 20 and the second susceptor 25. As a result, when the first magnetic material 20*a* of the first susceptor 20 reaches the Curie temperature, heat is directly transferred from the second susceptor 25 to the first susceptor 20.

In the third embodiment described above, the lid member 50 described in Modified Example 1-2 is located on the other end of the aerosol-forming substrates 10, however, this lid member 50 is not an essential component. The same applies to the fourth embodiment and the sixth to eighth embodiments to be described later, as well as their modified examples.

According to the smoking device cartridge 3 configured as described above, approximately the same effects as that in the second embodiment can be achieved.

Furthermore, since the first susceptor 20 and the second susceptor 25 are positioned in line along the longitudinal direction of the aerosol-forming substrates 10, the aerosol-forming substrates 10 can be uniformly heated along the longitudinal direction.

In addition, since the one end part of the first susceptor 20 and the other end part of the second susceptor 25 are thermally coupled, even if the first magnetic material 20*a* of the first susceptor 20 reaches the Curie temperature during use of the smoking device cartridge 3, heat from the second susceptor 25 can be directly transferred to the first susceptor 20. Consequently, it is possible to prevent the overall temperature of the first susceptor 20 and second susceptor 25 from decreasing, and the aerosol-forming substrates 10 can be heated stably.

In the third embodiment described above, the first scepter 20 and the second scepter 25 have the specific configuration in which they are formed in the columnar shapes with different outer diameters, however, configurations of the first scepter 20 and the second scepter 25 are not limited to the aforementioned specific configuration. For example, the first scepter 20 and the second scepter 25 may be configured as shown in FIG. 18 or 19.

Figure 18:
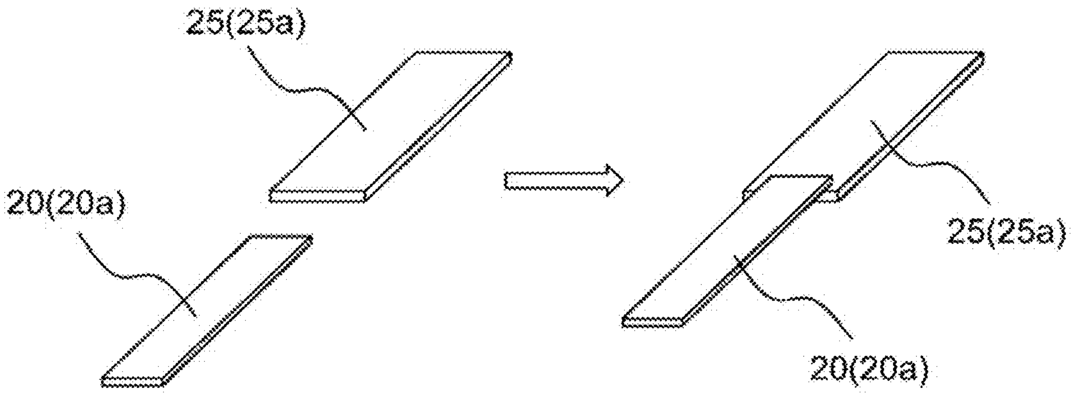
FIG. 18 is a perspective view showing another example of the first susceptor and the second susceptor.

FIG. 18 is a perspective view showing another example of the first susceptor and the second susceptor.

As shown in FIG. 18, the first susceptor 20 and the second susceptor 25 are formed in sheet-like shapes. The length (width) of the second susceptor 25 in the short-length direction is larger than the width of the first susceptor 20. As in the second embodiment described above, one end part of the first susceptor 20 is thermally coupled to the other end part of the second susceptor 25. In FIG. 18, the first susceptor 20 is in contact with the front surface (upper surface) of the second susceptor 25, however, the first susceptor 20 may be in contact with the back surface (lower surface) of the second susceptor 25.

Figure 19:
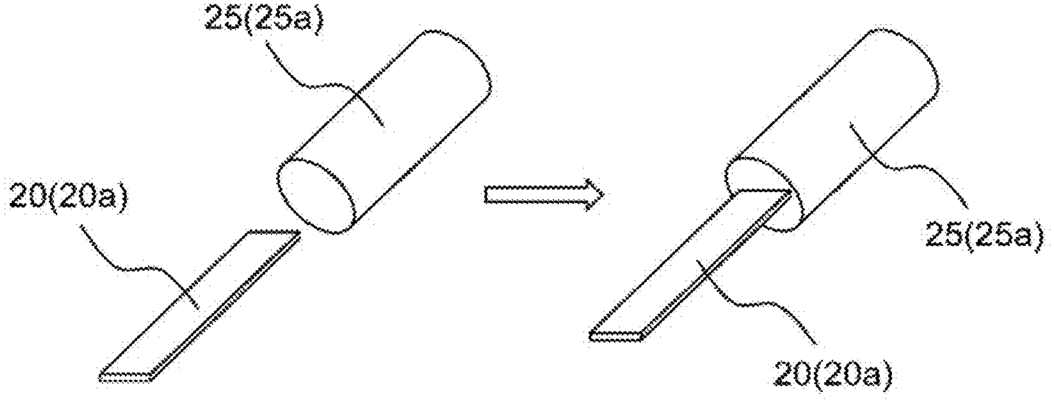
FIG. 19 is a perspective view showing still another example of the first susceptor and the second susceptor.

FIG. 19 is a perspective view showing still another example of the first susceptor and the second susceptor.

As shown in FIG. 19, the first susceptor 20 is in a sheet shape, while the second susceptor 25 is formed in a columnar shape. The outer diameter of the second susceptor 25 is larger than the width of the first susceptor 20. As in the second embodiment described above, one end part of the first susceptor 20 is thermally coupled to the other end part of the second susceptor 25. Additionally, a recessed fitting part may be provided on the other end face of the second susceptor 25, and one end part of the first susceptor 20 may be fitted into the above-described fitting part.

The configuration of the first susceptor 20 and the second susceptor 25 as shown in FIGS. 18 and 19 also can achieve approximately the same effects as that in the third embodiment.

Fourth Embodiment

Figure 20:
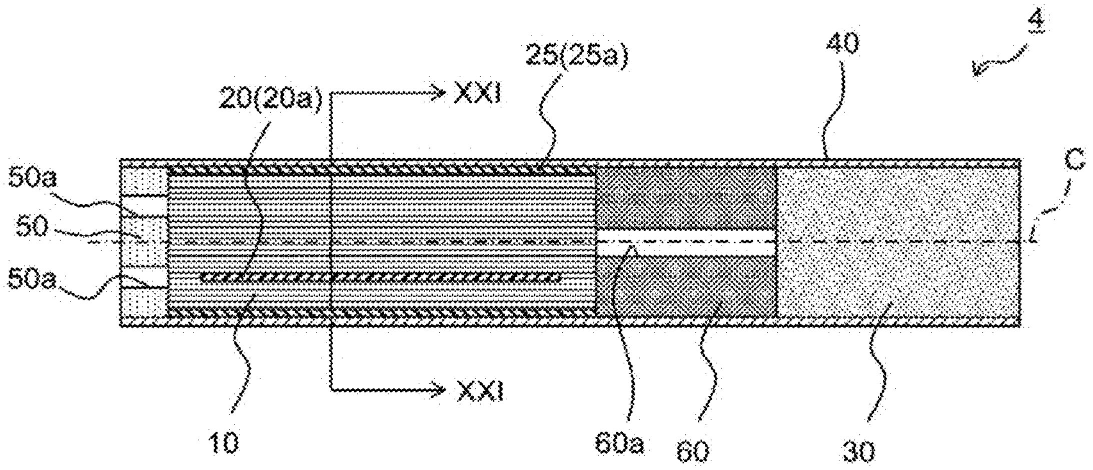
FIG. 20 is a cross-sectional view showing a smoking device cartridge according to a fourth embodiment.

Next, with reference to FIGS. 20 and 21, a smoking device cartridge according to a fourth embodiment will be described. FIG. 20 is a cross-sectional view showing the smoking device cartridge according to the fourth embodiment, and FIG. 21 is a cross-sectional view along the line XXI-XXI of FIG. 20.

Figure 21:
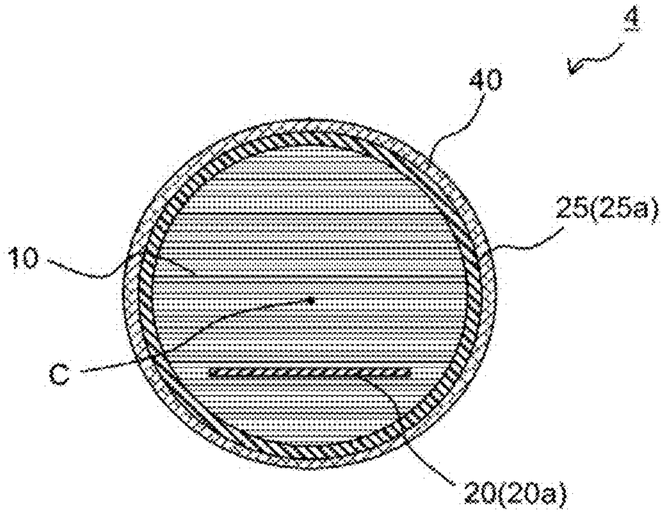
FIG. 21 is a cross-sectional view along the line XXI-XXI of FIG. 20.

As shown in FIGS. 20 and 21, the smoking device cartridge 4 according to the fourth embodiment is different from the smoking device cartridge according to the third embodiment in that the second susceptor 25 is located on the outer peripheral surface of the aerosol-forming substrates 10. Specifically, the second susceptor 25 is made of the second magnetic material 25*a* formed in a sheet shape, and is wound so as to cover the entire outer peripheral surface of the aerosol-forming substrates 10. As a result, the first susceptor 20 is positioned inside the cylindrical second susceptor 25.

The first susceptor 20 is formed in a sheet shape, and located along the longitudinal direction of the aerosol-forming substrates 10. This first susceptor 20 is positioned off-center from the central axis C of the smoking device cartridge 4, and, in FIG. 20, is located below the central axis C.

When such a smoking device cartridge 4 is mounted in induction heating type smoking device (refer to FIG. 3), unlike the first embodiment (refer to FIG. 3), the second susceptor 25 is also positioned inside the coil of the smoking device. The inner peripheral surface of the second susceptor 25 faces the first susceptor 20, and the area of the inner peripheral surface of the second susceptor 25 is larger than the area of the other end surface of the second susceptor 25 in the first embodiment (refer to FIG. 1). The above-described second susceptor 25 generates a stronger magnetic field around the first susceptor 20 than in the first embodiment. As a result, a stronger alternating magnetic field is generated around the first susceptor 20 by the coil of the induction heating type smoking device and the second susceptor 25. This causes a larger induction current to flow through the first susceptor 20, and thereby, the induction heating of the first susceptor 20 can be performed extremely effectively.

According to the smoking device cartridge 4 of the fourth embodiment configured as described above, approximately the same effects as that in the first embodiment can be achieved.

In addition, since the second susceptor 25 is formed in the sheet shape and wound so as to cover the outer peripheral surface of the aerosol-forming substrates 10, the alternating magnetic field generated around the first susceptor 20 can be strengthened as compared with that in the first embodiment. This causes the larger induction current to flow through the first susceptor 20, and thereby, the induction heating of the first susceptor 20 can be effectively performed.

In particular, since the second susceptor 25 is wound around the entire outer peripheral surface of the aerosol-forming substrates 10 and the first susceptor 20 is located inside the second susceptor 25, the induction heating of the first susceptor 20 can be performed extremely effectively as described above.

As mentioned above, since the second susceptor 25 is located inside of the coil in the induction heating type smoking device, the temperature of the second susceptor 25 becomes high during use of the smoking device cartridge 4, and there is a possibility that the portion of the packaging member 40 that covers the aerosol-forming substrates 10 (i.e., the portion in contact with the second susceptor 25) is heated to a high temperature. For this reason, it is preferable to increase the thickness of the packaging member 40 or adopt configurations such as in modified examples described below.

Hereinafter, modified examples of the fourth embodiment will be described.

Modified Example 4-1

Figure 22:
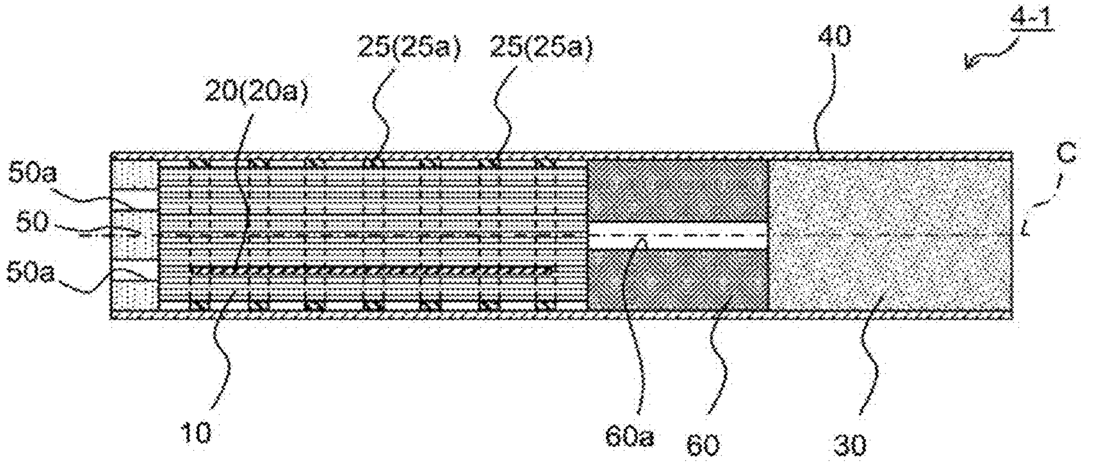
FIG. 22 is a cross-sectional view showing a smoking device cartridge according to Modified Example 4-1 of the fourth embodiment.

Next, with reference to FIG. 22, a smoking device cartridge according to Modified Example 4-1 will be described. FIG. 22 is a cross-sectional view showing the smoking device cartridge according to Modified Example 4-1 of the fourth embodiment.

As shown in FIG. 22, the smoking device cartridge 4-1 according to Modified Example 4-1 is different from the smoking device cartridge according to the fourth embodiment in that the second susceptors 25 partly cover the outer peripheral surface of the aerosol-forming substrates 10. Specifically, the second susceptor 25 is formed in an elongated band shape, and is wound around the outer peripheral surface of the aerosol-forming substrates 10 in an annular shape. There are a plurality of the annular second susceptors 25 (in this example, seven second susceptors 25), and the second susceptors 25 are arranged at predetermined intervals in a range from one end to the other end of the aerosol-forming substrates 10. The length (width) of each second susceptor 25 in the short-length direction is in the range of, for example, 4 mm to 18 mm.

According to the smoking device cartridge 4-1 configured as described above, approximately the same effects as that in the fourth embodiment can be achieved.

In addition, since the second susceptor 25 formed in the elongated band shape is wound around the outer peripheral surface of the aerosol-forming substrates 10 in the annular shape, it is possible to prevent the portion of the packaging member 40 that covers the aerosol-forming substrates 10 from being heated to the high temperature during use of the smoking device cartridge 4-1.

Modified Example 4-2

Figure 23:
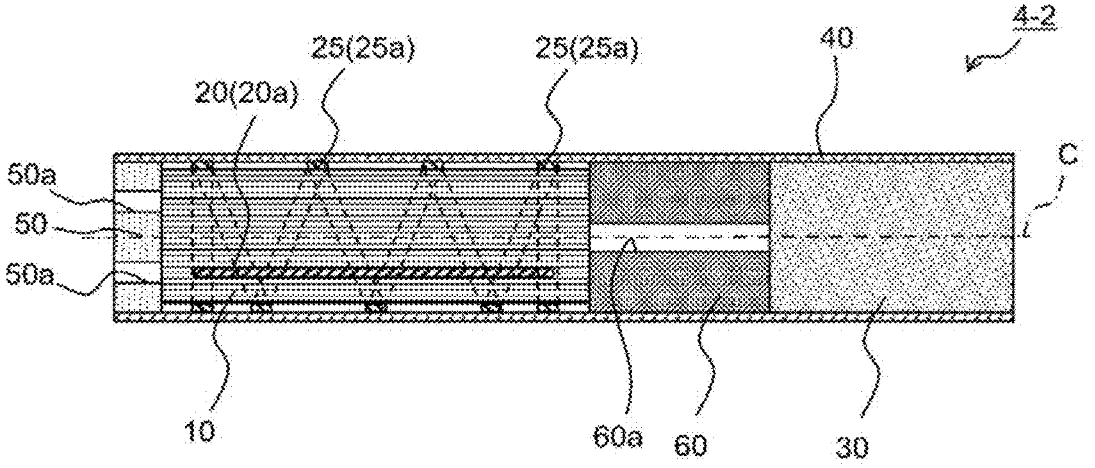
FIG. 23 is a cross-sectional view showing a smoking device cartridge according to Modified Example 4-2 of the fourth embodiment.

Next, with reference to FIG. 23, a smoking device cartridge according to Modified Example 4-2 will be described. FIG. 23 is a cross-sectional view showing the smoking device cartridge according to Modified Example 4-2.

As shown in FIG. 23, the smoking device cartridge 4-2 according to Modified Example 4-2 is different from the smoking device cartridge according to Modified Example 4-1 in that the second susceptor 25 is helically wound at a predetermined pitch around the outer peripheral surface of the aerosol-forming substrates 10. The number of pitches of the second susceptor 25 can be appropriately determined according to, for example, the materials of the first susceptor 20 and second susceptor 25, the materials of the aerosol-forming substrates 10, the materials and thickness of the packaging member 40, or the like.

According to the smoking device cartridge 4-2 configured as described above, approximately the same effects as that in Modified Example 4-1 can be achieved.

In addition, since one linear second susceptor 25 can simply be helically wound around the outer peripheral surface of the aerosol-forming substrates 10 in manufacturing of the smoking device cartridge 4-2, the manufacturing is easier than that in Modified Example 4-1.

Fifth Embodiment

Figure 24:
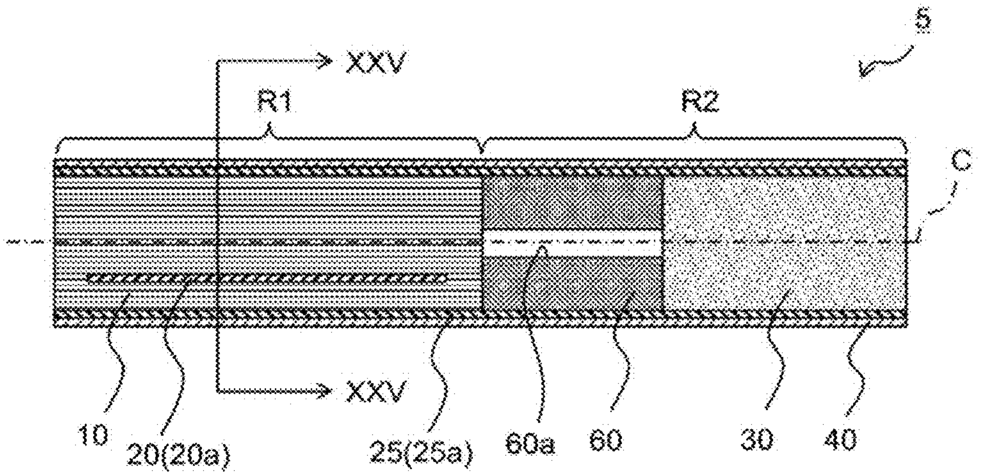
FIG. 24 is a cross-sectional view showing a smoking device cartridge according to a fifth embodiment.

Next, with reference to FIGS. 24 and 25, a smoking device cartridge according to a fifth embodiment will be described. FIG. 24 is a cross-sectional view showing the smoking device cartridge according to the fifth embodiment, FIG. 25 is a cross-sectional view along the line XXV-XXV of FIG. 24.

Figure 25:
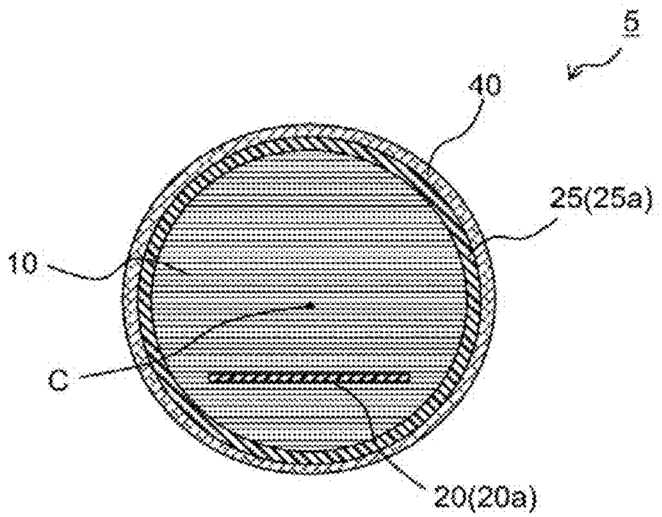
FIG. 25 is a cross-sectional view along the line XXV-XXV of FIG. 24.

As shown in FIGS. 24 and 25, the smoking device cartridge 5 according to the fifth embodiment is different from the smoking device cartridge according to the fourth embodiment in the configuration of the second susceptor 25. Specifically, the second susceptor 25 is made of a magnetic paint containing the second magnetic material 25*a*, and is coated to the entire inner peripheral surface of the packaging member 40. In other words, the second susceptor 25 is configured by a coating film in which the magnetic paint is coated to the entire inner peripheral surface of the packaging member 40. As a result, when the packaging member 40 wraps around and integrates the aerosol-forming substrates 10, the support member 60, and the mouthpiece 30, the second susceptor 25 is positioned so as to overlap with the outer peripheral surfaces of these elements. In the present embodiment, the density of the second magnetic material 25*a* contained in the magnetic paint is adjusted to be low so that the temperature of the second susceptor 25 itself does not become high. The density is in the range of, for example, 0.5 $g/cm^3$ to 8.0 $g/cm^3$.

The above-mentioned second susceptor 25, which is coated to the area R1 overlapping with the aerosol-forming substrates 10 on the inner peripheral surface of the packaging member 40, has approximately the same function as the second susceptor 25 described in the fourth embodiment. That is, this second susceptor 25 generates the stronger alternating magnetic field around the first susceptor 20 during use of the smoking device cartridge 5. Thereby, the induction heating of the first susceptor 20 is performed extremely effectively. On the other hand, the second susceptor 25, which is coated to the area R2 overlapping with the support member 60 and the mouthpiece 30, has approximately the same function as the second susceptor 25 described in the first embodiment. That is, this second susceptor 25 stabilizes the induction heating of the first susceptor 20.

According to the smoking device cartridge 5 configured as described above, approximately the same effects as that in the fourth embodiment can be achieved.

In addition, the second susceptor 25, which is made of the magnetic paint containing the second magnetic material 25*a*, is coated to areas on the inner peripheral surface of the exterior member 40, the areas overlapping with the aerosol-forming substrates 10, the support member 60, and the mouthpiece 30. As a result, it is possible to further strengthen the alternating magnetic field generated around the first susceptor by the second susceptor 25 coated to the area R1 overlapping with the aerosol-forming substrates 10, and the induction heating of the first susceptor 20 can be stably performed by the second susceptor 25 coated to the other area (area R2).

Furthermore, since the magnetic paint is inexpensive and easily available, it is possible to decrease the manufacturing cost.

Hereinafter, modified examples of the fifth embodiment will be described.

Modified Example 5-1

Figure 26:
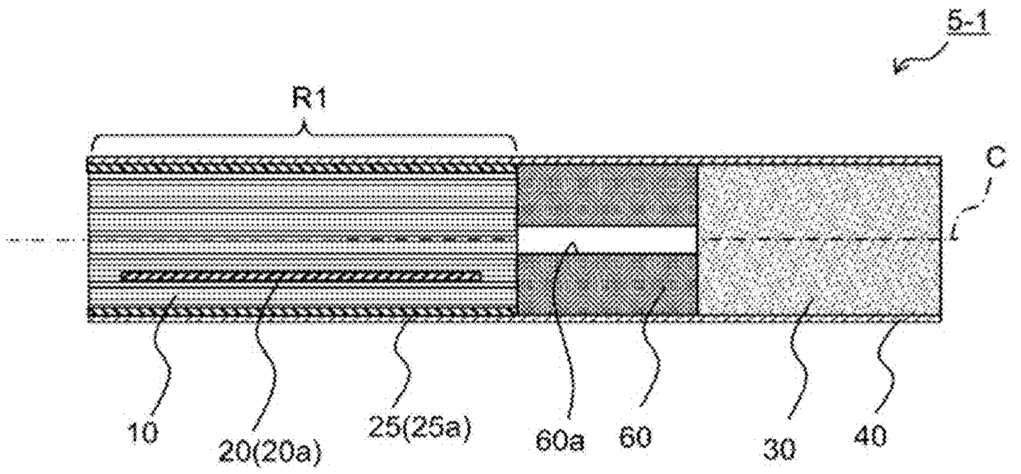
FIG. 26 is a cross-sectional view showing a smoking device cartridge according to Modified Example 5-1 of the fifth embodiment.

Next, with reference to FIG. 26, a smoking device cartridge according to Modified Example 5-1 will be described. FIG. 26 is a cross-sectional view showing the smoking device cartridge according to Modified Example 5-1.

As shown in FIG. 26, the smoking device cartridge 5-1 according to Modified Example 5-1 is different from the smoking device cartridge according to the fifth embodiment in the area where the second susceptor 25 is coated on the inner peripheral surface of the packaging member 40. Specifically, the second susceptor 25 is coated to the area R1 on the inner peripheral surface of the packaging member 40, the area R1 overlapping with the aerosol-forming substrates 10. On the other hand, the second susceptor 25 is not coated to the area R2 (refer to FIG. 24) on the inner peripheral surface of the packaging member 40, the area R2 overlapping with the support member 60 and the mouthpiece 30. This second susceptor 25 is only located on the outer peripheral surface of the aerosol-forming substrates 10, and thereby has approximately the same function as the second susceptor 25 described in the fourth embodiment.

According to the smoking device cartridge 5-1 configured as described above, it is possible to further strengthen the alternating magnetic field generated around the first susceptor by the second suscepter 25 coated to the area R1 on the inner peripheral surface of the packaging member 40, the area R1 overlapping with the aerosol-forming substrates 10.

Modified Example 5-2

Figure 27:
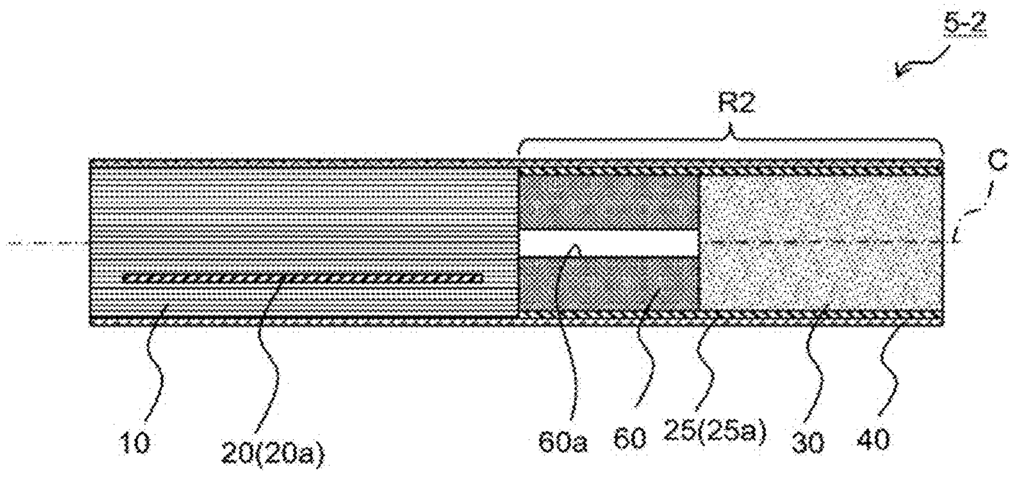
FIG. 27 is a cross-sectional view showing a smoking device cartridge according to Modified Example 5-2 of the fifth embodiment.

Next, with reference to FIG. 27, a smoking device cartridge according to Modified Example 5-2 will be described. FIG. 27 is a cross-sectional view showing the smoking device cartridge according to Modified Example 5-2.

As shown in FIG. 27, the smoking device cartridge 5-2 according to Modified Example 5-2 is different from the smoking device cartridge according to Modified Example 5-1 in the area where the second susceptor 25 is coated on packaging member 40. Specifically, the second susceptor 25 is coated to the area R2 on the inner peripheral surface of the packaging member 40, the area R2 overlapping with the support member 60 and the mouthpiece 30. On the other hand, the second susceptor 25 is not coated to the area R1 (refer to FIG. 24) on the inner peripheral surface of the packaging member 40, the area R1 overlapping with the aerosol-forming substrates 10. This second susceptor 25 is not located on the outer peripheral surface of the aerosol-forming substrates 10, and thereby has approximately the same function as the second susceptor 25 described in the first embodiment.

According to the smoking device cartridge 5-2 configured as described above, it is possible to stably perform the induction heating of the first susceptor 20 by the second suscepter 25 coated to the area R2 on the inner peripheral surface of the packaging member 40, the area R2 overlapping with the support member 60 and mouthpiece 30.

In the case that the temperature of the second susceptor 25 does not become high due to a low density of the second magnetic material 25*a* contained in the second susceptor 25 during use of the smoking device cartridge 5-2, the Curie temperature of the second magnetic material 25*a* of the second susceptor 25 may not be set to be higher than the Curie temperature of the first magnetic material 20*a* of the first susceptor 20 because the second susceptor 25 can always maintain its property as the ferromagnetic material.

Modified Example 5-3

Figure 28:
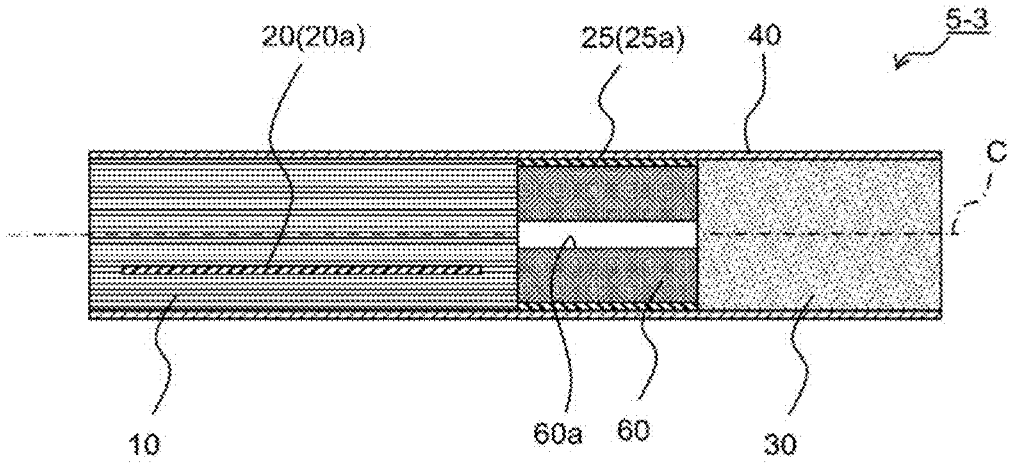
FIG. 28 is a cross-sectional view showing a smoking device cartridge according to Modified Example 5-3 of the fifth embodiment.

Next, with reference to FIG. 28, a smoking device cartridge according to Modified Example 5-3 will be described. FIG. 28 is a cross-sectional view showing the smoking device cartridge according to Modified Example 5-3.

As shown in FIG. 28, the smoking device cartridge 5-3 according to Modified Example 5-3 is different from the smoking device cartridge according to Modified Example 5-2 in that the second susceptor 25 is coated on the support member 60 instead of the packaging member 40.

The support member 60 is formed in the columnar shape having the above-mentioned hole portion 60*a*, and the second susceptor 25 is coated to the entire outer peripheral surface of the support member 60. This second susceptor 25 also has approximately the same function as the second susceptor 25 described in the first embodiment as that in Modified Example 5-2 described above. In the case that the support member 60 is made of crimped paper, the second susceptor 25 may be coated on the crimped paper.

According to the smoking device cartridge 5-3 configured as described above, approximately the same effects as that in Modified Example 5-2 can be achieved.

In the case that the temperature of the second susceptor 25 does not become high due to a low density of the second magnetic material 25*a* contained in the second susceptor 25 during use of the smoking device cartridge 5-3, the Curie temperature of the second magnetic material 25*a* of the second susceptor 25 may not be set to be higher than the Curie temperature of the first magnetic material 20*a* of the first susceptor 20 as described in Modified Example 5-2.

Sixth Embodiment

Figure 29:
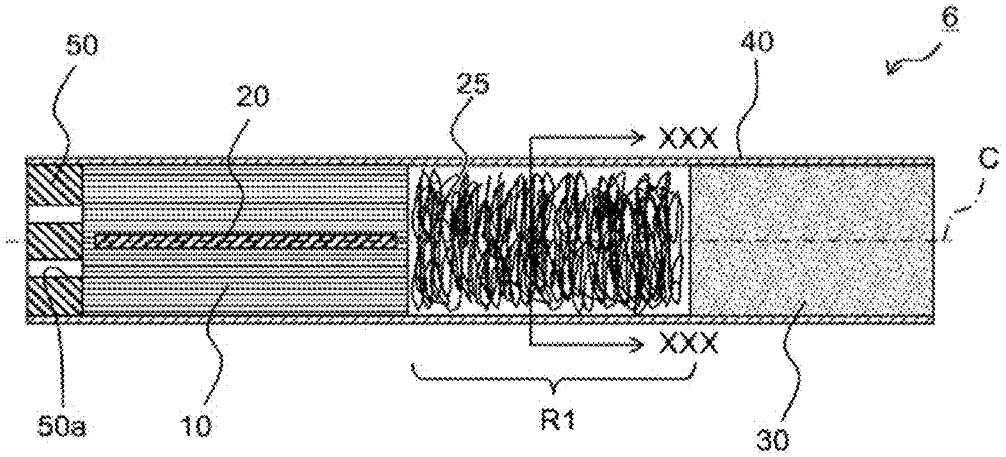
FIG. 29 is a cross-sectional view showing a smoking device cartridge according to a sixth embodiment.

Next, with reference to FIGS. 29 and 30, a smoking device cartridge according to a sixth embodiment will be described. FIG. 29 is a cross-sectional view showing the smoking device cartridge according to the sixth embodiment, and FIG. 30 is a cross-sectional view along the line XXX-XXX of FIG. 29.

Figure 30:
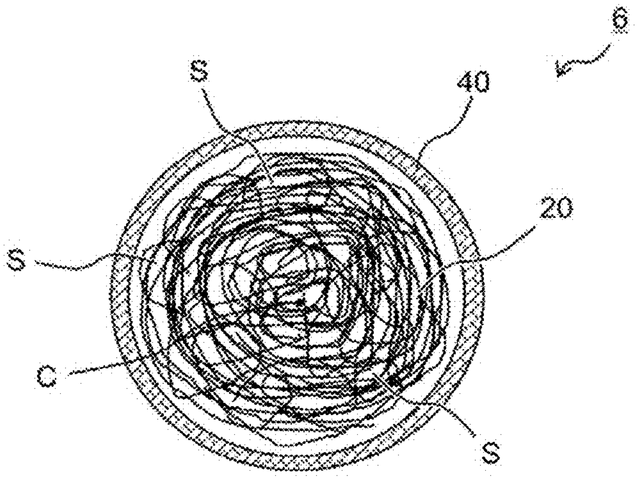
FIG. 30 is a cross-sectional view along the line XXX-XXX of FIG. 29.

As shown in FIGS. 29 and 30, the smoking device cartridge 6 according to the sixth embodiment is different from the smoking device cartridge according to the first embodiment in the configuration of the second susceptor 25. Specifically, the second susceptor 25 is made of a wool-like ferromagnetic metal material, and is located in a cylindrical first area R1 between the aerosol-forming substrates 10 and the mouthpiece 30.

As the metal material for the second susceptor 25, iron or nickel processed in a fibrous form is suitable, and an alloy of iron and nickel, an alloy of iron and chromium, or an alloy of iron, nickel, and chromium may also be used. In the present embodiment, the second susceptor 25 is made of a porous material having magnetism and conductivity, such as steel wool. The steel wool is fibrous iron having, for example, 0.2 mm diameter, is formed in a substantially columnar shape, and has a lot of gaps S inside (refer to FIG. 30). As a result, the second susceptor 25 has extremely good air permeability. The above-described second susceptor 25 can allow aerosol to pass extremely well toward the mouthpiece 30.

According to the smoking device cartridge 6 of the sixth embodiment configured as described above, approximately the same effects as that in the first embodiment can be achieved.

In addition, the aerosol generated by heating the aerosol-forming substrates 10 can pass through the gaps S of the wool-like second susceptor 25 and flow extremely well toward the mouthpiece 30. This can improve the air permeability of the second susceptor 25.

Since the above-described second susceptor 25 is made of steel wool, molding for manufacturing the second susceptor 25 is not required. This can make processing and preparation for the second susceptor 25 easy. The above-described second susceptor 25 can be very easily manufactured as compared with a case where a cylindrical silicone retaining a granular ferromagnetic metal material at a low density as the second susceptor 25, for example.

The above-described second susceptor 25 is made of the ferromagnetic metal material, thereby generates the magnetic field around the second susceptor 25. When the smoking device cartridge 6 is mounted in the induction heating type smoking device (refer to FIG. 3), the second susceptor 25 can cause the magnetic detection means provided in the smoking device to continuously detect the magnetic field generated by the second susceptor 25. As a result, the alternating current can be continuously passed through the coil provided in the smoking device, and the alternating magnetic field can be continuously generated inside the coil. Thereby, it is possible to stably perform the induction heating of the first susceptor 20.

Since the above-described second susceptor 25 is processed in the fibrous form, the density of the magnetic metal is low and the surface area of the second susceptor 25 is large. Thereby, the second susceptor 25 generates low heat even when exposed to the alternating magnetic field generated by the coil of the induction heating type smoking device, large heat radiation from the surface of the second susceptor 25 prevents temperature rise. The second susceptor 25, therefore, can cool the aerosol when the aerosol passes toward the mouthpiece 30.

Furthermore, the second susceptor 25 is made of the fibrous iron formed in the substantially columnar shape and has a certain degree of rigidity, and thereby has a function of supporting one end part of the aerosol-forming substrates 10. Consequently, the second susceptor 25 can prevent positional displacement of the aerosol-forming substrates 10. Additionally, the second susceptor 25 also has a function of supporting one end part of the first susceptor 20 in the case that the first susceptor 20 moves toward the second susceptor 25 inside the aerosol-forming substrates 10. The second susceptor 25, therefore, can also prevent positional displacement of the first susceptor 20.

Hereinafter, modified examples of the sixth embodiment will be described.

Modified Example 6-1

Figure 31:
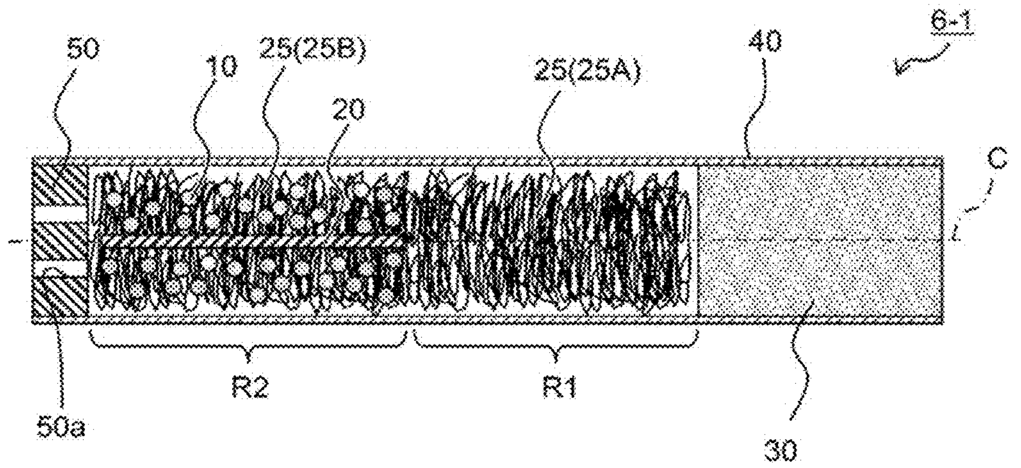
FIG. 31 is a cross-sectional view showing a smoking device cartridge according to Modified Example 6-1 of the sixth embodiment.

Next, with reference to FIG. 31, a smoking device cartridge according to Modified Example 6-1 will be described. FIG. 31 is a cross-sectional view showing the smoking device cartridge according to Modified Example 6-1 of the sixth embodiment.

As shown in FIG. 31, the smoking device cartridge 6-1 according to Modified Example 6-1 is different from the smoking device cartridge according to the sixth embodiment in that the second susceptor 25 made of the wool-like ferromagnetic metal material is located not only in a first area R1 between the aerosol-forming substrates 10 and the mouthpiece 30 but also in a second area R2 that is more upstream in the flow of the aerosol than the first area R1. This second area R2 is a cylindrical area from the right end of the lid member 50 to the left end of the first area R1, and is the area where the aerosol-forming substrates 10 is positioned. Hereinafter, the second susceptor 25 located in the first area R1 is referred to as the "lower second susceptor 25A," and the second susceptor 25 located in the second area R2 is referred to as the "upper second susceptor 25B."

The lower second susceptor 25A and the upper second susceptor 25B are made of steel wool having the same specifications, and their densities are substantially uniform. Additionally, the lower second susceptor 25A and the upper second susceptor 25B are connected to each other at the boundary position between the first area R1 and the second area R2. It should be noted that the lower second susceptor 25A and the upper second susceptor 25B are not limited to the above-described configuration and may also be configured with respective separate steel wools.

According to the smoking device cartridge 6-1 configured as described above, approximately the same effects as the smoking device cartridge 1 in the first embodiment can be achieved.

In addition, it is possible to diffuse heat generated by the induction heating of the first susceptor 20 by the upper second susceptor 25B, and thereby, the thermal conductivity to the aerosol-forming substrates 10 can be improved.

In the case that the raw material of the aerosol-forming substrates 10 is formed in a granular or pasty form, it is possible to easily retain the granular or paste raw material of the aerosol-forming substrates 10 by the upper second susceptor 25B.

Figure 32:
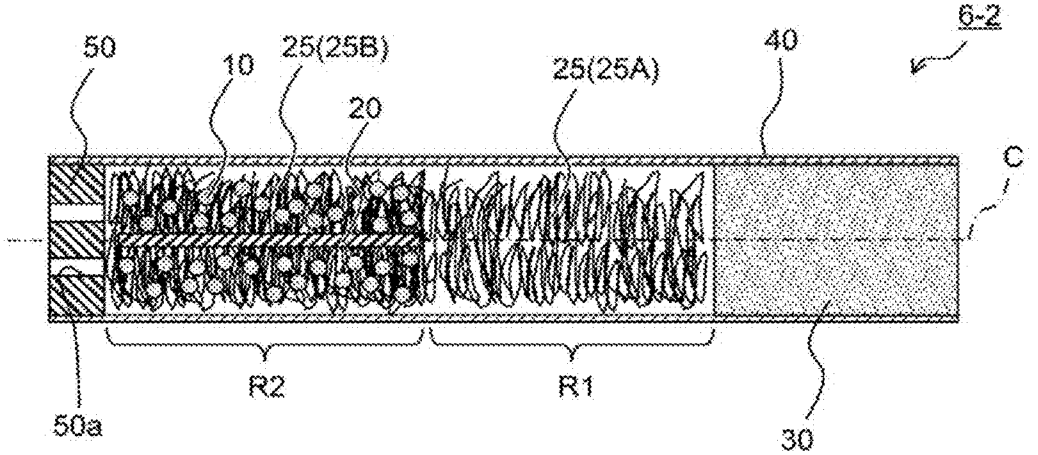
FIG. 32 is a cross-sectional view showing a smoking device cartridge according to Modified Example 6-2 of the sixth embodiment.

Next, with reference to FIG. 32, a smoking device cartridge according to Modified Example 6-2 will be described. FIG. 32 is a cross-sectional view showing the smoking device cartridge according to Modified Example 6-2 of the sixth embodiment.

As shown in FIG. 32, the smoking device cartridge 6-2 according to Modified Example 6-2 is different from the smoking device cartridge according to Modified Example 6-1 in that the density of the lower second susceptor 25A and the density of the upper second susceptor 25B are different from each other.

Specifically, the lower second susceptor 25A and the upper second susceptor 25B are configured with respective separate steel wools, and the density of the upper second susceptor 25B is set to be higher than the density of the lower second susceptor 25A. Since the upper second susceptor 25B in the present modified example is denser than that in Modified Example 6-1, heat from the first susceptor 20 is easily transferred to the aerosol-forming substrate 10. By reducing the density of the lower second susceptor 25A, the lower second susceptor 25A in the present modified example has more gaps S than that in Modified Example 6-1, and thereby, the air permeability of the lower second susceptor 25A is further improved.

According to the smoking device cartridge 6-2 configured as described above, approximately the same effects as that in Modified Example 6-1 can be achieved.

In addition, by the upper second susceptor 25B, it is possible to further improve the thermal conductivity to the aerosol-forming substrate and the air permeability of the lower second susceptor 25A.

In Modified Example 6-2 mentioned above, the lower second susceptor 25A and the upper second susceptor 25B are both made of steel wool, however, both of them may be made of different wool-like ferromagnetic metal materials. Even in this case, approximately the same effects as described above can be achieved.

Figure 33:
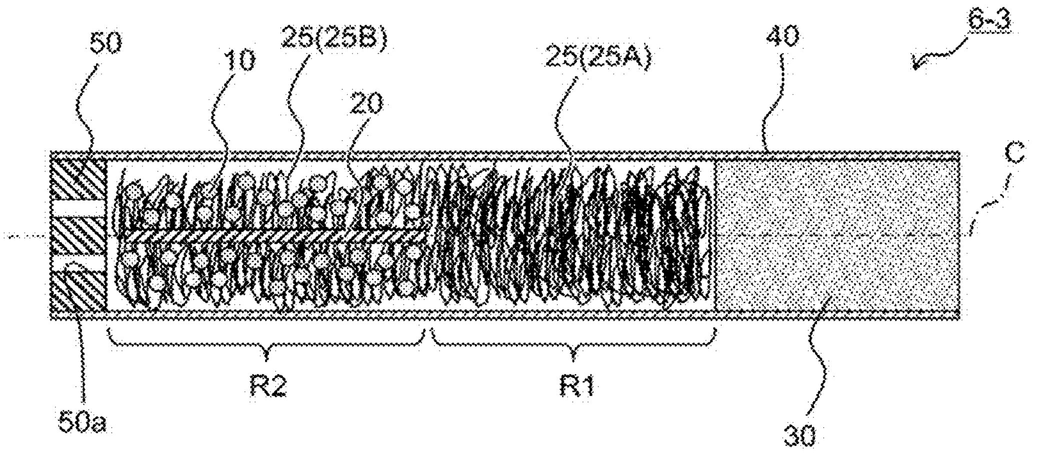
FIG. 33 is a cross-sectional view showing a smoking device cartridge according to Modified Example 6-3 of the sixth embodiment.

Next, with reference to FIG. 33, a smoking device cartridge according to Modified Example 6-3 will be described. FIG. 33 is a cross-sectional view showing the smoking device cartridge according to Modified Example 6-3 of the sixth embodiment.

As shown in FIG. 33, the smoking device cartridge 6-3 according to Modified Example 6-3 is different from the smoking device cartridge according to Modified Example 6-2 in that the density of the lower second susceptor 25A is set to be higher than the density of the upper second susceptor 25B. Since the density of the lower second susceptor 25A is set to be higher, it is possible to strengthen the magnetic field generated by the lower second susceptor 25A (ferromagnetic metallic material) as compared with that in Modified Example 6-1. Additionally, by reducing the density of the upper second susceptor 25B, it is possible to ensure heat diffusion by the first susceptor 20 while simplifying the structure of the upper second susceptor 25B as compared with that in Modified Example 6-1.

According to the smoking device cartridge 6-3 configured as described above, approximately the same effects as that in Modified Example 6-1 can be achieved.

In addition, the lower second susceptor 25A can further stabilize the alternating current flowing through the coil of the induction heating type smoking device, while the upper second susceptor 25B can ensure the heat diffusion by the first susceptor 20 with a simple structure.

As described in Modified Examples 6-2 and 6-3, by altering the densities of the lower second susceptor 25A and the upper second susceptor 25B, it is possible to provide the smoking device cartridges with different functions, and it is also possible to meet a variety of preferences.

Figure 34:
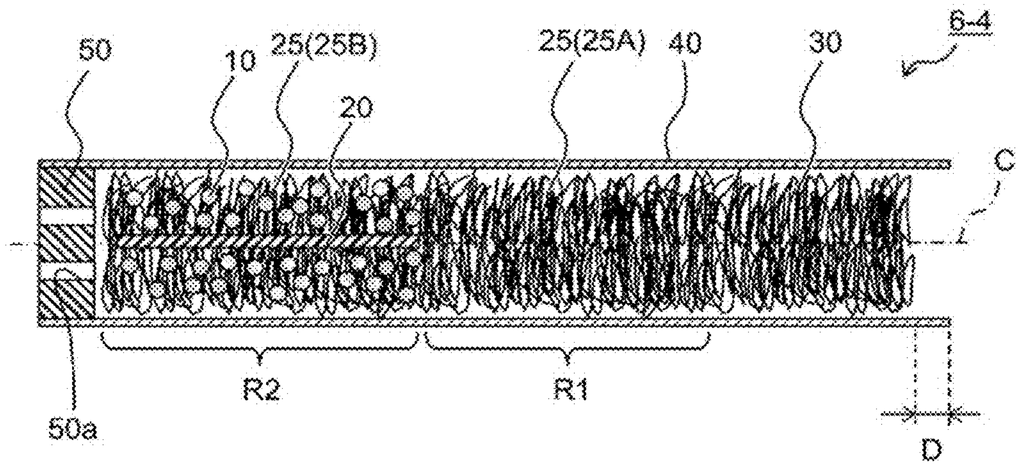
FIG. 34 is a cross-sectional view showing a smoking device cartridge according to Modified Example 6-4 of the sixth embodiment.

Next, with reference to FIG. 34, a smoking device cartridge according to Modified Example 6-4 will be described. FIG. 34 is a cross-sectional view showing the smoking device cartridge according to Modified Example 6-4 of the sixth embodiment.

As shown in FIG. 34, the smoking device cartridge 6-4 according to Modified Example 6-4 is different from the smoking device cartridge according to Modified Example 6-1 in that the mouthpiece 30, similar to the lower second susceptor 25A and the upper second susceptor 25B, is made of steel wool.

In Modified Example 6-4, the lower second susceptor 25A, the upper second susceptor 25B, and the mouthpiece 30 are made of steel wool having the same specifications. It should be noted that the lower second susceptor 25A, the upper second susceptor 25B, and the mouthpiece 30 are not limited to the above-described configuration and may also be configured with respective separate steel wools.

Herein, it is preferable that the right end of the mouthpiece 30 is located to the left of the right end of the packaging member 40 by a predetermined distance D. This can prevent the smoker's lip from touching the mouthpiece 30 during smoking.

According to the smoking device cartridge 6-4 configured as described above, approximately the same effects as that in Modified Example 6-1 can be achieved.

In addition, the mouthpiece 30 formed of paper or the like as described in Modified Example 6-1 or the like is not required, and the steel wool can be used as the mouthpiece 30, similar to the lower second susceptor 25A and the upper second susceptor 25B. Thereby, the number of components of the smoking device cartridge 6-4 can be reduced.

The right end of the above-described mouthpiece 30 is located to the left of the right end of the packaging member 40 by the predetermined distance D, and thereby, the smoker can comfortably smoke without his or her lip touching the mouthpiece 30 during smoking.

Seventh Embodiment

Figure 35:
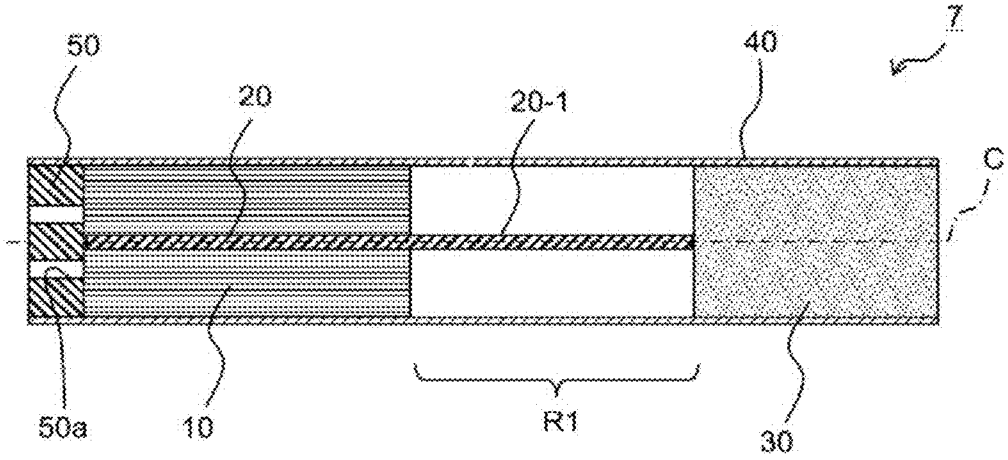
FIG. 35 is a cross-sectional view showing a smoking device cartridge according to a seventh embodiment.

Next, with reference to FIGS. 35 and 36, a smoking device cartridge according to a seventh embodiment will be described. FIG. 35 is a cross-sectional view showing the smoking device cartridge according to a seventh embodiment, and FIG. 36 is a plan view showing a first susceptor of FIG. 35.

Figure 36:
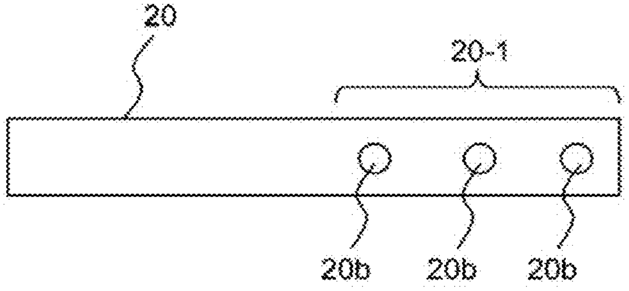
FIG. 36 is a plan view showing a first susceptor of FIG. 35.

As shown in FIGS. 35 and 36, the smoking device cartridge 7 according to the seventh embodiment is different from the smoking device cartridge according to the first embodiment in that the first susceptor 20 is extended from inside the aerosol-forming substrate 10 to the first area R1. Specifically, the first susceptor 20 has an exposed portion 20-1 protruding into the first area R1 between the aerosol-forming substrates 10 and the mouthpiece 30, and neither the second susceptor nor the support member is located in the first area R1.

Since the exposed portion 20-1 of the first susceptor 20 is located in the internal space of the first area R1, the exposed portion 20-1 has a larger heat dissipation and a faster cooling rate than the inside portion of the first susceptor 20, the inside portion being located inside the aerosol-forming substrates 10. This can prevent the first susceptor 20 from reaching its Curie temperature. As shown in FIG. 36, it is preferable that the exposed portion 20-1 of the first susceptor 20 has lightening holes 20*b* such as round holes, notches, or the like in order to effectively prevent heat generation. Nevertheless, even if such lightening holes 20*b* are not formed in the exposed portion 20-1, the heat dissipation is improved by positioning the exposed portion 20-1 in the internal space of the first area R1. This can prevent the first susceptor 20 from reaching its Curie temperature.

According to the smoking device cartridge 7 configured as described above, approximately the same effects as that in the first embodiment can be achieved.

In addition, since the first susceptor 20, which is located inside the aerosol-forming substrates 10, has the exposed portion 20-1 protruding into the internal space of the first area R1, the heat dissipation by the exposed portion 20-1 is improved, and it is possible to prevent the first susceptor 20 from reaching its Curie temperature.

Additionally, the second susceptor as described in the first embodiment, etc. is not required, and the exposed portion 20-1 formed integrally with the first susceptor 20 prevent the first susceptor 20 from reaching its Curie temperature. Thereby, the structure of the smoking device cartridge 7 is simplified, and the assembling workability is improved.

The total length of the above-described first susceptor 20 is sufficiently longer than the aerosol-forming substrates 10. Hence, by inserting the first susceptor 20 into the aerosol-forming substrates 10 from the end (left end in FIG. 35) after placing the aerosol-forming substrates 10 in packaging member 40, it is possible to position the first susceptor 20 inside the aerosol-forming substrates 10 and the exposed portion 20-1 in the first area R1. This also improves the assembling workability.

Furthermore, by extending the total length of the first susceptor 20 to the extent that the exposed portion 20-1 contacts the mouthpiece 30, the first susceptor 20 can also be used as the support member supporting the aerosol-forming substrate 10. Thereby, the number of components of the smoking device cartridge 7 can be reduced, and cost reduction can be achieved.

Eighth Embodiment

Figure 37:
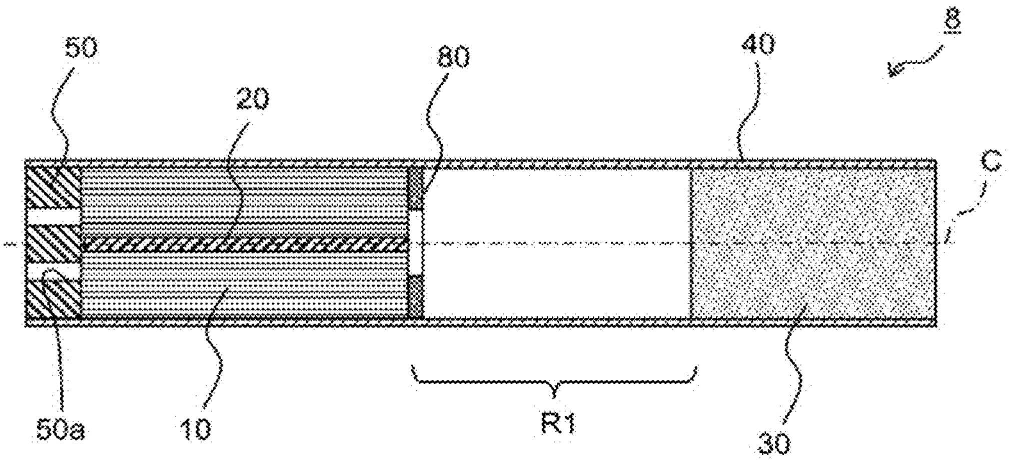
FIG. 37 is a cross-sectional view showing a smoking device cartridge according to an eighth embodiment.

Next, with reference to FIGS. 37 and 38, a smoking device cartridge according to an eighth embodiment will be described. FIG. 37 is a cross-sectional view showing the smoking device cartridge according to an eighth embodiment, and FIG. 38 is a plan view showing a magnetism inductor of FIG. 37.

Figure 38:
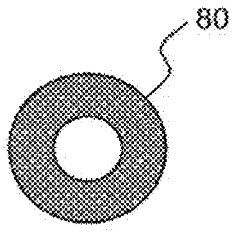
FIG. 38 is a plan view showing a magnetism inductor of FIG. 37.

As shown in FIGS. 37 and 38, the smoking device cartridge 8 according to the eighth embodiment is different from the smoking device cartridge according to the first embodiment in that a ring-shaped magnetism inductor 80 is in contact with one end (right end in FIG. 37) of the aerosol-forming substrate 10 and there is no second susceptor between the aerosol-forming substrates 10 and the mouthpiece 30. Specifically, the magnetism inductor 80 is located between the aerosol-forming substrates 10 and the mouthpiece 30 in an orientation perpendicular to the central axis C of the smoking device cartridge 8, and this magnetism inductor 80 is in close contact with one end face of the aerosol-forming substrates 10.

The magnetism inductor 80 is a ring-shaped metal plate made of a ferromagnetic or paramagnetic material, or a non-magnetic metal material. In the present embodiment, a stainless steel ring washer as shown in FIG. 38 is used. The magnetism inductor 80 is set to be approximately the same size as the inner diameter of the packaging member 40, and has a function as a support member to support the aerosol-forming substrates 10 by contacting the one end face of the aerosol-forming substrates 10. In particular, in the case that the aerosol-forming substrates 10 is sandwiched between the lid member 50 and the magnetism inductor 80 as in the present embodiment, the aerosol-forming substrates 10 can be stably supported in the packaging member 40.

According to the smoking device cartridge 8 configured as described above, approximately the same effects as that in the first embodiment can be achieved.

In addition, the ring-shaped magnetism inductor 80 is located between the aerosol generation substrate 10 and the mouthpiece 30, and this magnetism inductor 80 is perpendicular to the central axis C of the smoking device cartridge 8. When the smoking device cartridge 8 is mounted in the induction heating type smoking device (refer to FIG. 3), a magnetic field based on an eddy current induced in the magnetism inductor 80 by a coil magnetic field of the smoking device is generated more effectively than that in first embodiment and the like. This magnetic field is detected by the magnetic detection means provided in the smoking device, and thereby, even if the magnetism inductor 80 is formed of the paramagnetic material or the non-magnetic material, approximately the same effects as the second susceptor made of the ferromagnetic material according to the sixth embodiment (refer to FIG. 29) can be achieved.

The above-described ring-shaped magnetism inductor 80, which has approximately the same size as the inner diameter of the packaging member 40 and can be fitted inside the packaging member 40, is in contact with the one end face of the aerosol-forming substrates 10. Thereby, the magnetism inductor 80 can also be used as the support member for the aerosol-forming substrate 10. Nevertheless, the magnetism inductor 80 may be located at a position spaced apart from the one end face of the aerosol-forming substrates 10. The number of the magnetism inductors 80 is not limited to one, and a plurality of the magnetism inductors 80 may be located between the aerosol-forming substrates 10 and the mouthpiece 30.

Modified Example 8-1

Figure 39:
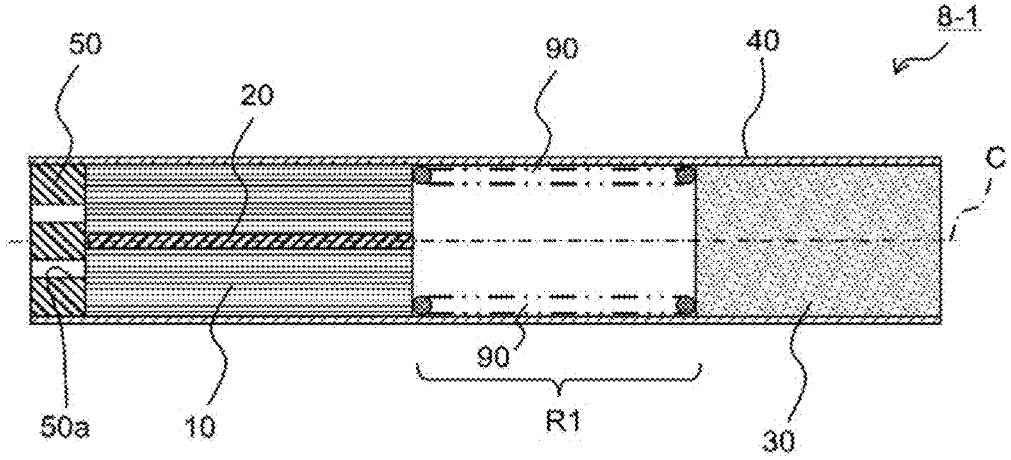
FIG. 39 is a cross-sectional view showing a smoking device cartridge according to Modified Example 8-1 of the eighth embodiment.

Next, with reference to FIGS. 39 and 40, a smoking device cartridge according to Modified Example 8-1 will be described. FIG. 39 is a cross-sectional view showing the smoking device cartridge according to Modified Example 8-1 of the eighth embodiment, and FIG. 40 is a perspective view showing a magnetism inductor of FIG. 39.

Figure 40:
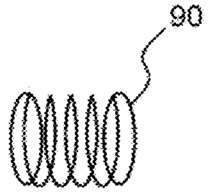
FIG. 40 is a perspective view showing a magnetism inductor of FIG. 39.

As shown in FIGS. 39 and 40, the smoking device cartridge 8-1 according to Modified Example 8-1 is different from the smoking device cartridge according to the eighth embodiment in that a spring-shaped magnetism inductor 90 is located between the aerosol-forming substrate 10 and the mouthpiece 30. Specifically, respective ends of the magnetism inductor 90 formed of a coil spring are in contact with the aerosol-forming substrates 10 and the mouthpiece 30.

According to the smoking device cartridge 8-1 configured as described above, approximately the same effects as that in the eighth embodiment can be achieved. In this case, it is preferable that both ends of the magnetism inductor 90 have shapes with closed rings as shown in FIG. 40 in order to effectively generate the eddy current.

In addition, since the magnetism inductor 90 is formed in the spring shape, the support function for supporting the aerosol-forming substrates 10 is significantly improved as compared with the magnetism inductor 80 formed of the ring washer according to the eighth embodiment.

It is also possible to use the magnetism inductor 80 formed of the ring washer according to the eighth embodiment and the magnetism inductor 90 formed in the spring shape according to Modified Example 8-1 in combination. In this case, the magnetism inductor 80 formed of the ring washer may be brought into contact with one end of the aerosol-forming substrates 10, and the magnetism inductor 90 formed in the spring shape may be interposed between this magnetism inductor 80 and the mouthpiece 30.

It is also possible to combine the configuration of the seventh embodiment with the configuration of the eighth embodiment or Modified Example 8-1. In this case, the ring-shaped magnetism inductor 80 or the spring-shaped magnetism inductor 90 may be positioned between the aerosol-forming substrates 10 and the mouthpiece 30, and the exposed portion 20-1 of the first susceptor 20 may be positioned so as to penetrate the magnetism inductor 80 or the magnetism inductor 90.

It should be noted that the present invention is not limited to the above-described embodiments, various modifications are possible without departing from the gist of the present invention, and all of the technical matters included in the technical idea described in the claims are subject to the present invention. While the above-described embodiment has shown preferred examples, those skilled in the art can realize various alternatives, modifications, variations, or improvements from the contents disclosed in the present specification, and these are included in the technical scope described in the appended claims.

In the first embodiment described above, as the preferable example of the first magnetic material **20*a* and the second magnetic material 25*a*, it has been described that nickel can be used as the first magnetic material 20*a* and iron can be used as the second magnetic material 25*a*, however, examples of the first magnetic material 20*a* and the second magnetic material 25*a*** are not limited to the aforementioned preferable example. The above-described combination of the first magnetic material and the second magnetic material is merely one example, and various combinations of magnetic materials can be used as long as the Curie temperature of the second magnetic material is higher than the Curie temperature of the first magnetic material.

In the first embodiment described above, the first scepter 20 and the second scepter 25 have the specific configuration in which the first magnetic material **20*a* is formed of the sheet shape, however, configurations of the first scepter 20 and the second scepter 25 are not limited to the aforementioned specific configuration. For example, the first scepter 20 and the second scepter 25** may be formed by solidifying magnetic materials formed in a powder or granule form into a sheet shape via an adhesive (e.g. heat-resistant silicone).

In the first embodiment described above, the second scepter 25 have the specific configuration in which the magnetic materials **25*a* is solidified into the columnar shape via the adhesive 25*b*, however, configurations of the second susceptor 25** are not limited to the aforementioned specific configuration. For example, the magnetic material itself may be formed columnarly.

In the first embodiment described above, although the Curie temperature of the second magnetic material **25*a* of the second susceptor 25 is set to be higher than the Curie temperature of the first magnetic material 20*a* of the first susceptor 20, the present invention is not limited to this configuration. For example, in the case that the density of the second magnetic material 25*a* contained in the second susceptor 25 is low and the second susceptor 25 does not reach high temperature, the second susceptor 25 can always maintain its property as ferromagnetic materials. Thereby, the Curie temperature of the second magnetic material 25*a* of the second susceptor 25 may not be set to be higher than the Curie temperature of the first magnetic material 20*a* of the first susceptor 20**.

In the second embodiment mentioned above, the second susceptor 25 has the specific configuration in which the second susceptor 25 is in contact with the front surface of the first susceptor 20, however, configurations of the second susceptor 25 are not limited to the aforementioned specific configuration. The second susceptor 25 may be configured to be in contact with the back surface of the first susceptor 20.

In Modified Example 2-1 mentioned above, the second susceptor 25 has the specific configuration in which the second susceptor 25 is in contact with the back surface of the first susceptor 20, however, configurations of the second susceptor 25 are not limited to the aforementioned specific configuration. The second susceptor 25 may be configured to be in contact with the front surface of the first susceptor 20.

In the third embodiment mentioned above, although the outer diameter of the second susceptor 25 is larger than the outer diameter of the first susceptor 20, the present invention is not limited to this configuration. The outer diameter of the first susceptor 20 may be larger than the outer diameter of the second susceptor 25. Furthermore, the shapes of the first susceptor 20 and the second susceptor 25 are not limited to the columnar or sheet shapes as described above, and may be various shapes including quadrangular prism shapes, triangular prism shapes, and the like.

In the third embodiment mentioned above, although the first susceptor 20 and the second susceptor 25 are configured to be in contact with each other, the present invention is not limited to this configuration. The first susceptor 20 and the second susceptor 25 may be spaced apart inside the aerosol-forming substrates 10. Even in this case, approximately the same effects as that in the third embodiment can be achieved.

In the third embodiment mentioned above, although the number of first susceptor 20 was one, the number of first susceptor 20 is not limited to this and may be two or more. In this case, the two or more first susceptors 20 may be in contact with each other, or may be spaced apart from each other. In this way, the aerosol-forming substrates 10 can be more uniformly heated along the longitudinal direction of the aerosol-forming substrates 10.

In the fourth embodiment mentioned above, although the sheet-like second susceptor 25 is configured to be wound around the outer peripheral surface of the aerosol-forming substrates 10, the present invention is not limited to this configuration. As long as the second susceptor 25 is wound around the outer peripheral surface of the aerosol-forming substrates 10, the second susceptor 25 may also be wound around the outer peripheral surface of the lid member 50, the support member 60, or the mouthpiece 30.

In the fourth embodiment mentioned above, although the sheet-like second magnetic material **25*a* is configured to cover the entire outer peripheral surface of the aerosol-forming substrates 10, the present invention is not limited to this configuration. The sheet-like second magnetic material 25*a* may be configured to cover only the upstream part of the aerosol-forming substrates 10 in the flow of the aerosol, may be configured to cover only the downstream part of the aerosol-forming substrates 10, may be configured to cover the central part of the aerosol-forming substrates 10** between the upstream part and the downstream part, or may be configured to combine these configurations.

In Modified Example 4-1 mentioned above, although the number of the annular second susceptor 25 was seven, the number of the annular second susceptor 25 is not limited to seven, and can be suitably determined, for example, depending on the material of the aerosol-forming substrates 10, etc.

In Modified Example 5-2 according to the fifth embodiment mentioned above, the second susceptor 25, which is made of the magnetic paint containing the second magnetic material **25*a*, is configured to be coated to the area R2 on the inner peripheral surface of the packaging member 40, the area R2 overlapping with the support member 60 and the mouthpiece 30. However, the present invention is not limited to this configuration. For example, the second susceptor 25 may be coated only to the area overlapping with the support member 60 on the inner peripheral surface of the packaging member 40, or may be coated only to the area overlapping with the mouthpiece 30**.

In Modified Example 5-3 according to the fifth embodiment mentioned above, although the second susceptor 25, which is made of the magnetic paint containing the second magnetic material **25*a*, is configured to be coated on the outer peripheral surface of the support member 60, the present invention is not limited to this configuration. For example, the second susceptor 25 may also be coated on the outer peripheral surface of the mouthpiece 30**.

In addition, in the above-mentioned second to fifth embodiments and modified examples, although the configuration in which the support member 60 is provided in the smoking device cartridge has been described, the present invention is not limited to this configuration. For example, in the case that the second susceptor 25 is not provided inside or around the support member 60, the support member 60 may not be necessarily provided. In this case, there will be a void between the mouthpiece 30 and the aerosol-forming substrates 10. As a result, manufacturing cost can be reduced by reduction of the number of the components, and the air permeability can be improved.

EXPLANATION OF REFERENCE LETTERS

1 to 1-2, 2 to 2-4, 3, 4 to 4-2, 5 to 5-3 smoking device cartridge
6 to 6-4, 7, 8 to 8-1 smoking device cartridge
10 aerosol-forming substrates
20 first susceptor
**20*a*** first magnetic material
20-1 exposed portion
25 second susceptor
**25*a*** second magnetic material
25A lower second susceptor
25B upper second susceptor
30 mouthpiece
40 packaging member
60 support member
70 induction heating type smoking device
80, 90 magnetism inductor
R1 first area
R2 second area

What is claimed is:

1. A smoking device cartridge to be mounted in an induction heating type smoking device for use, the smoking device cartridge comprising aerosol-forming substrates and a mouthpiece located coaxially with the aerosol-forming substrates, the smoking device cartridge further comprising:

a first susceptor containing a first magnetic material; and a second susceptor containing a second magnetic material, wherein the first susceptor is located inside the aerosol-forming substrates to enable heating of the aerosol-forming substrates, the entire second susceptor is located outside the aerosol-forming substrates, the second susceptor being located between the aerosol-forming substrates and the mouthpiece, a Curie temperature of the second magnetic material is higher than a Curie temperature of the first magnetic material, and the aerosol-forming substrates with the first susceptor is-located inside, the second susceptor located entirely outside the aerosol-forming substrates, and the mouthpiece are arranged in sequence in a longitudinal direction of the smoking device cartridge.

2. The smoking device cartridge according to claim 1, wherein the second susceptor is formed by solidifying the second magnetic material in a powder or granular form into a columnar shape via an adhesive or a silicone, and the second susceptor having the columnar shape is located coaxially with the aerosol-forming substrates, the second susceptor containing the adhesive or the silicone.

3. The smoking device cartridge according to claim 2, wherein a length of the columnar shape in the longitudinal direction is larger than an outer diameter of the columnar shape.

4. The smoking device cartridge according to claim 2, wherein the density of the second magnetic material is within the range of 0.5 g/cm$^3$ to 8.0 g/cm$^3$.

5. The smoking device cartridge according to claim 1, wherein the second magnetic material is iron, nickel, an alloy of iron and nickel, cobalt, ferrite, neodymium, heat-resistant neodymium, samarium cobalt, alnico, ferritic stainless steel, or martensitic stainless steel.

* * * * *